United States Patent [19]

Taniguchi et al.

[11] 4,420,236
[45] Dec. 13, 1983

[54] CAMERA FOR USE WITH FILM HAVING SPROCKET HOLES AND/OR CODED PERFORATIONS

[75] Inventors: Nobuyuki Taniguchi; Takeo Hoda; Shigeru Oyokota; Kiyoshi Seigenji, all of Sakai, Japan

[73] Assignee: Minolta Camera Kabushiki Kaisha, Osaka, Japan

[21] Appl. No.: 377,447

[22] Filed: May 12, 1982

[30] Foreign Application Priority Data

May 20, 1981 [JP] Japan .................................. 56-77127

[51] Int. Cl.³ .......................... G03B 7/24; G03B 17/28
[52] U.S. Cl. ...................................... 354/21; 354/203; 354/289.12
[58] Field of Search ..................... 354/21, 28, 37, 41, 354/58, 173, 203, 215, 217, 218, 289; 352/78 C, 92, 172

[56] References Cited

U.S. PATENT DOCUMENTS

| | | | |
|---|---|---|---|
| 4,139,294 | 2/1979 | Aneshansley et al. | 354/217 |
| 4,173,401 | 11/1979 | Harvey | 354/21 |
| 4,274,726 | 6/1981 | Yoneyama et al. | 354/173 |
| 4,286,849 | 9/1981 | Uchidoi et al. | 354/23 D |
| 4,304,480 | 12/1981 | Fukahori et al. | 354/173 |
| 4,304,481 | 12/1981 | Ichiyanagi | 354/173 |

FOREIGN PATENT DOCUMENTS 42-22329 12/1965 Japan .
42-27 1/1967 Japan .

OTHER PUBLICATIONS

Research Disclosure, the issue of Apr. 1980 No. 182, entitled "Photographic Film Coding" on p. 142.

*Primary Examiner*—William B. Perkey
*Attorney, Agent, or Firm*—Watson, Cole, Grindle & Watson

[57] ABSTRACT

The camera detects coded perforations of the film at a detecting position for reading out information represented by coded perforations on the film. The camera back cover includes a pressure plate to resiliently abut the film at the exposure station and coacts with film abutting structure to maintain the film flat at a detecting position such that the coded perforations on the film can be read out to generate a film sensitivity signal and two different outputs are provided to indicate whether or not the film is of standard sensitivity and the film sensitivity is displayed. The display modes are changeable.

16 Claims, 40 Drawing Figures

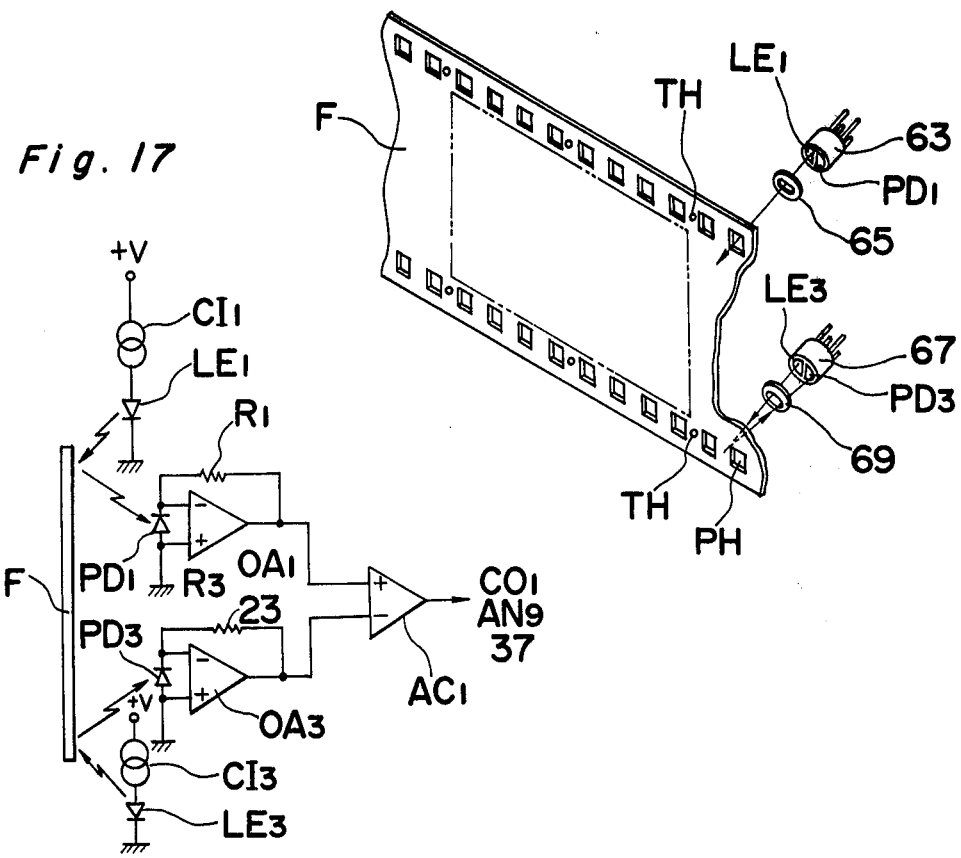
Fig. 15
Fig. 17
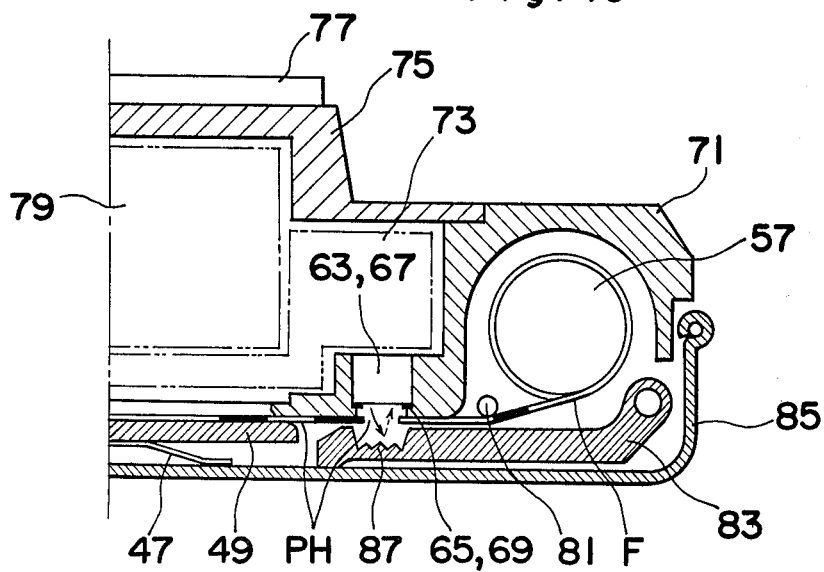
Fig. 16

CAMERA FOR USE WITH FILM HAVING SPROCKET HOLES AND/OR CODED PERFORATIONS

FIELD OF THE INVENTION

The present invention relates to a photographic camera capable of reading sprocket holes and/or coded perforations on a film when it is used with such film.

BACKGROUND OF THE INVENTION

"Research Disclosure, April 1980, Number 192", page 142, discloses a photographic film having a pair of spaced rows of sprocket holes, 8 sprocket holes per imaging area (film frame) on the film, and a leader portion of the film formed with a series of digitally coded areas, some or all of which are perforated for identifying respective photographic characteristics of the film.

Where a photographic camera utilizes such a film as disclosed in "Research Disclosure" and the sprocket holes and/or the coded perforations are desired to be used out, the film must retain, or be retained, its flatness at the location where they are read out. Although a pressure plate usually secured to the back cover of the camera can be utilized to retain the film flat, the pressure plate has its main function to urge the film towards a pair of spaced film guide rails at an exposure station and, therefore, where a read-out device is provided in the camera at such exposure station, there is the possibility that, when and after the leader portion of the film has been wound onto a spool, some or all of the coded perforations would have moved past the read-out device with the consequent failure of the read-out device to generate a output indicative of the data represented by the coded perforations. Where the read-out device is arranged in the camera at a position past the pressure plate, since when the film having been drawn out of the patrone (cartridge) a larger amount than required is wound onto the spool and when the back cover is subsequently closed, the film being sandwiched between the film guide rails and the pressure plate as the back cover is being closed is squeezed to curl, the accurate and faithful reading of the coded perforation can not be performed. The detection by the read-out device is also possible subject to the sprocket holes, and the read-out device may be used, for example, in counting the sprocket holes for the purpose of determination of the length of the film to be advanced.

Moreover, since where the above described film is utilized, the reading of the coded perforations takes place as the film moves past the read-out device, the use of a memory device for storing information read out from the coded perforations is necessary where the camera is to be controlled in dependence on such information. When it comes to the memory device, an electrically operated memory device is desirable in the case of the camera which is generally required to be compact in size and to have an electrically controlled feature. However, even though the memory device is used, the removal of a battery providing a source of electrical power out of the camera results in erasing of the contents stored in the memory device. Accordingly, so far as the camera utilizing the above described film is involved, countermeasures must be taken to avoid the unnecessary erasing of the information once stored in the memory device.

Where as the read-out device an optical read-out device such as disclosed in the above mentioned "Research Disclosure" is utilized, light emitted from a light emitting element passes through the coded perforation or the sprocket holes when they are brought into register with the detection position, but is reflected towards a photo sensor when inperforate areas of the film are brought into register with the detection position, with the consequence that the photo sensor generates a pulse output. However, where means for retaining the film flat is positioned rearwardly of the film, the light that has passed through the coded perforations or the sprocket holes tends to be reflected towards the photo sensor from the surface of the retaining means and, as a result thereof, the difference between the outputs given by the photo sensor when the coded perforation or the sprocket hole has been brought into register with the detection position and when it is not in register with the detection position, respectively, tends to become small to such an extent that the detection of the coded perforation or the sprocket holes becomes difficult. In order to avoid this problem, the U.S. Pat. No. 4,304,480 discloses the pressure plate coated black on one of its surfaces facing the film for the purpose of causing the reflected light to be attenuated. However, since a light emitting element emits an infrared light, a mere black coating of the surface of the pressure plate would not solve the problem effectively and, therefore, a special black pigment effective to absorb the infrared light must be used for the coating.

In the above described film, information represented by the coded perforations may include the film speed, the color temperature of the film, the expiration date of the film and others, and it is desired that a worning can be automatically made in dependence on the information whenever inaccurate and/or improper conditions occur in the camera. By way of example, since the film speed of the film now largely used is ASA 100 or ASA 400, a beginner photographer is generally not accustomed to set to the camera a different film speed other than the usual film speeds and will fail to do so when the film of the different film speed is occasionally loaded in the camera. In addition, considering that the film is available in three types i.e., Type-A (a tungsten type having a color temperature of 3,400 K.), Type-B (a tungsten type having a color temperature of 3,200 K.) and Type-D (a daylight type having a color temperature of 5,500 K.), a photographic picture, when taken under electronic flash lighting condition using any one of the tungsten type films, tends to show an unnatural color.

Furthermore, when it comes to the film of which the expiration date has already expired, not only is the film speed reduced, but also the use of such film is likely to result in deteriorated color presentation. Accordingly, it is desirable to warn the photographer that he or she is currently using the film of which the expiration date has already expired.

Apart from the above discussed matters, in the case where the camera is so designed that, when and after the film has been loaded in the camera, an automatic preparatory winding of the film to bring an initial imaging area (film frame) on the film to the exposure station can be performed in response to the detection of the film loading, the photographer will be nonplused if the film is wound up at a high speed during a period subsequent to the film loading and before the back cover is closed and, in the worst case it may happen, he or she will cut his or her finger by the edge of the film being wound up at the high speed. Therefore, it has long been desired to effect the preparatory winding of the film at a low speed up until the back cover is completely closed.

Further, it has often occurred that the film, some of the imaging areas (film frames) of which have been photographically exposed, is rewound into the patrone or cartridge and then unloaded from the camera for use at a different occasion. For example, after the photographer has taken pictures on 10 consecutive imaging areas out of the maximum available 24 frames of one film with a particular camera and then unloaded it from such particular camera, he will reload the film in such particular camera or a different camera for taking pictures on the remaining unexposed imaging areas. In such case, the reloaded film must be advanced to make the camera's film frame counter to read "11". According to the prior art, the reloaded film must be advanced frame to frame manually by operating a film wind-up lever until the film frame counter show that the eleventh imaging area has brought to the exposure station. This procedure is really inconvenient and time-consuming, and it has long been desired to permit the film to be automatically advanced to the eleventh imaging area if a number "11" is preset to the camera. In addition, for indicating or warning the photographer that the number of the film imaging areas to be advanced which has been preset is inadvertently greater than the number of the film imaging areas to be actually advanced, the camera is desired to have an adequate warning system.

SUMMARY OF THE INVENTION

Accordingly, the present invention has for its essential object to provide a photographic camera capable of assuredly reading the coded perforations and/or sprocket holes.

Another object of the present invention is to provide an optical read-out device for use in the camera capable of reading the coded perforations and/or sprocket holes.

A further object of the present invention is to provide a camera of the type referred to above wherein means is provided for avoiding any possible unnecessary erasing of the stored information read-out from the coded perforations and/or sprocket holes, which would otherwise result from the removal of a battery from the camera.

A still further object of the present invention is to provide a camera of the type referred to above which is capable of discriminating whether or not the film speed of the film then loaded in the camera is one of the usually utilized film speeds and also of displaying it.

A still further object of the present invention is to provide camera of the type referred to above capable of warning the photographer that the film then loaded in the camera is not suited for use under electronic flash lighting condition.

A still further object of the present invention is to provide a camera of the type referred to above, which is, if the film having it expiration date expiring, is then loaded in the camera, capable of warning the photographer to that effect. In this case, it is required to use a circuit for comparing a digital signal generated from a date recording device indicative of the date of photographying with information concerning the expiration date of the film which has been read out in the form of a digital signal, and, accordingly, it is one of the object of the present invention to provide such comparing circuit.

A yet further object of the present invention is to provide a camera of the type referred to above, in which the preparatory winding of the film can be effected at an accelerated speed upon closure of the back cover subsequent to the loading of the film into the camera.

A still yet object of the present invention is to provide a camera of the type referred to above, wherein the number of imaging areas (or film frames) of the film to be advanced preparatorily can be preset.

BRIEF DESCRIPTION OF THE DRAWINGS

These and other objects and features of the present invention will readily become apparent from the following detailed description of the embodiments taken in conjunction with the accompanying drawings, in which:

FIG. 15 is a perspective view of a detector system for use with the film shown in FIG. 12;

FIG. 16 is a sectional view of the camera using the detector system shown in FIG. 15;

FIG. 17 is a circuit diagram showing an electrical circuit for the detector system of FIG. 15;

Figure 3:
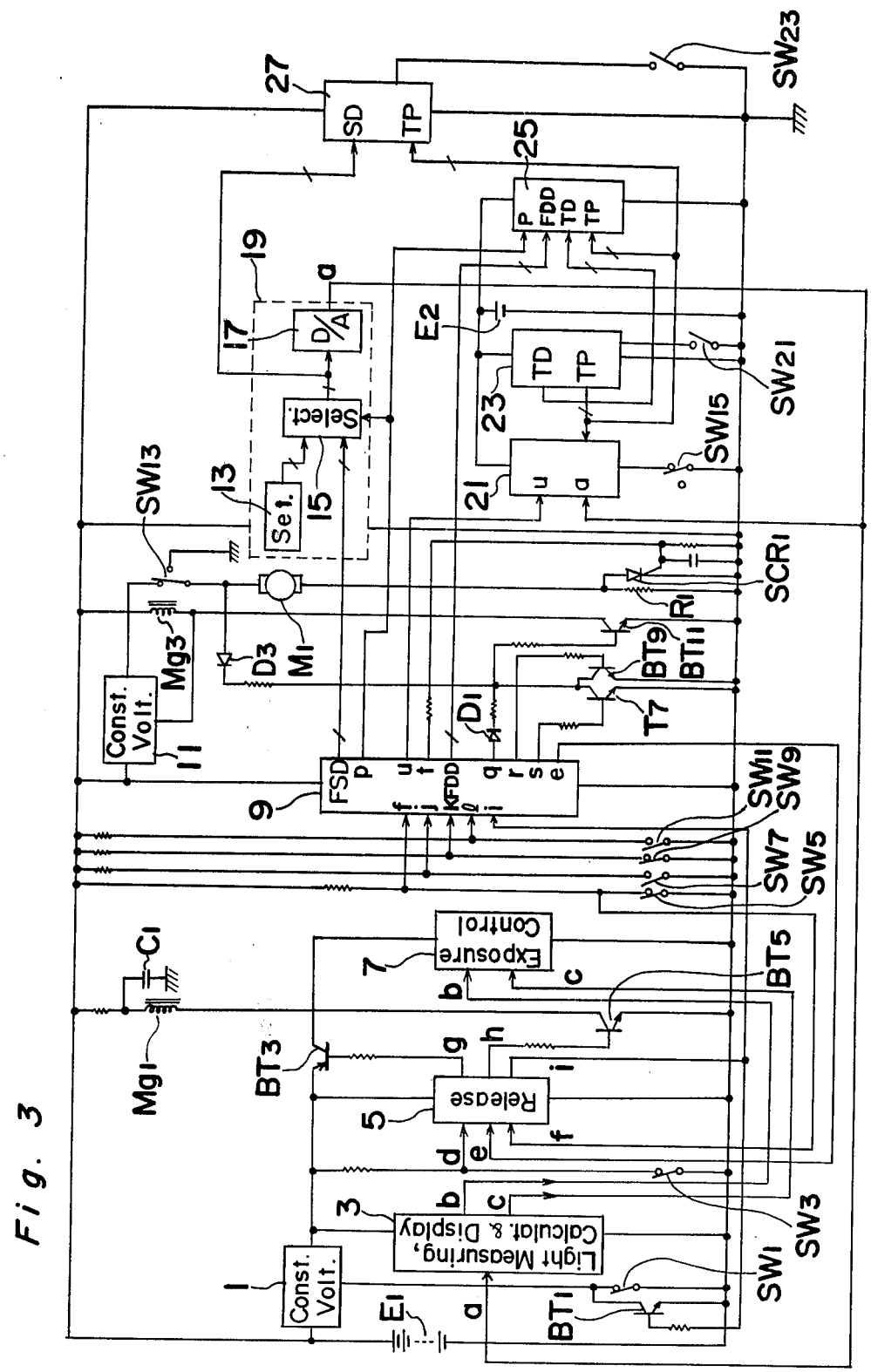
FIG. 3 is a block circuit diagram showing an electrical circuit used in a camera embodying the present invention.
Figures 5, 5A:
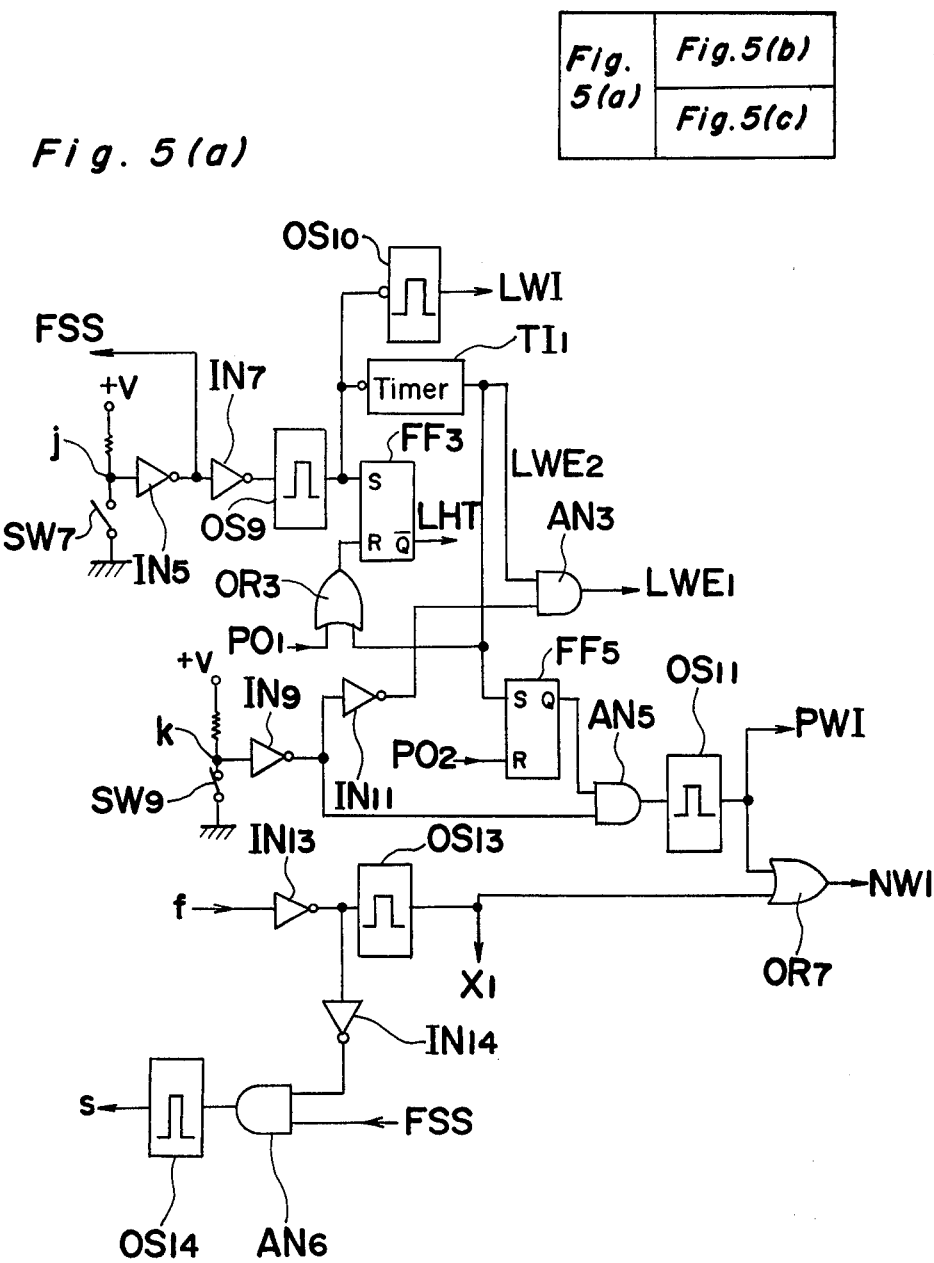
FIGS. 5 and 6 illustrate the details of a circuit block shown in FIG. 3, FIG. 5 consisting of FIGS. 5(a) to 5(c)
Figure 5B:
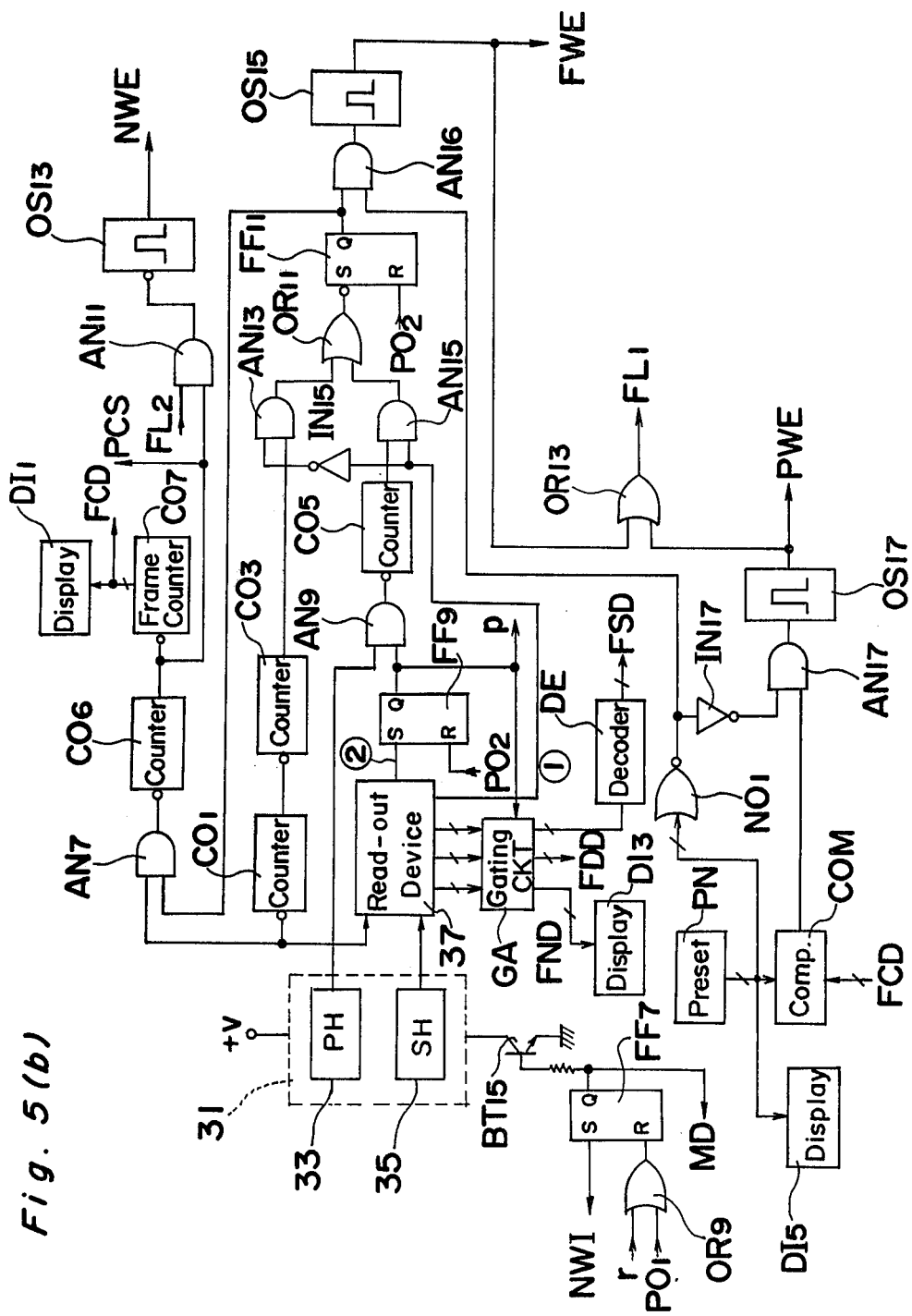
Figure 5C:
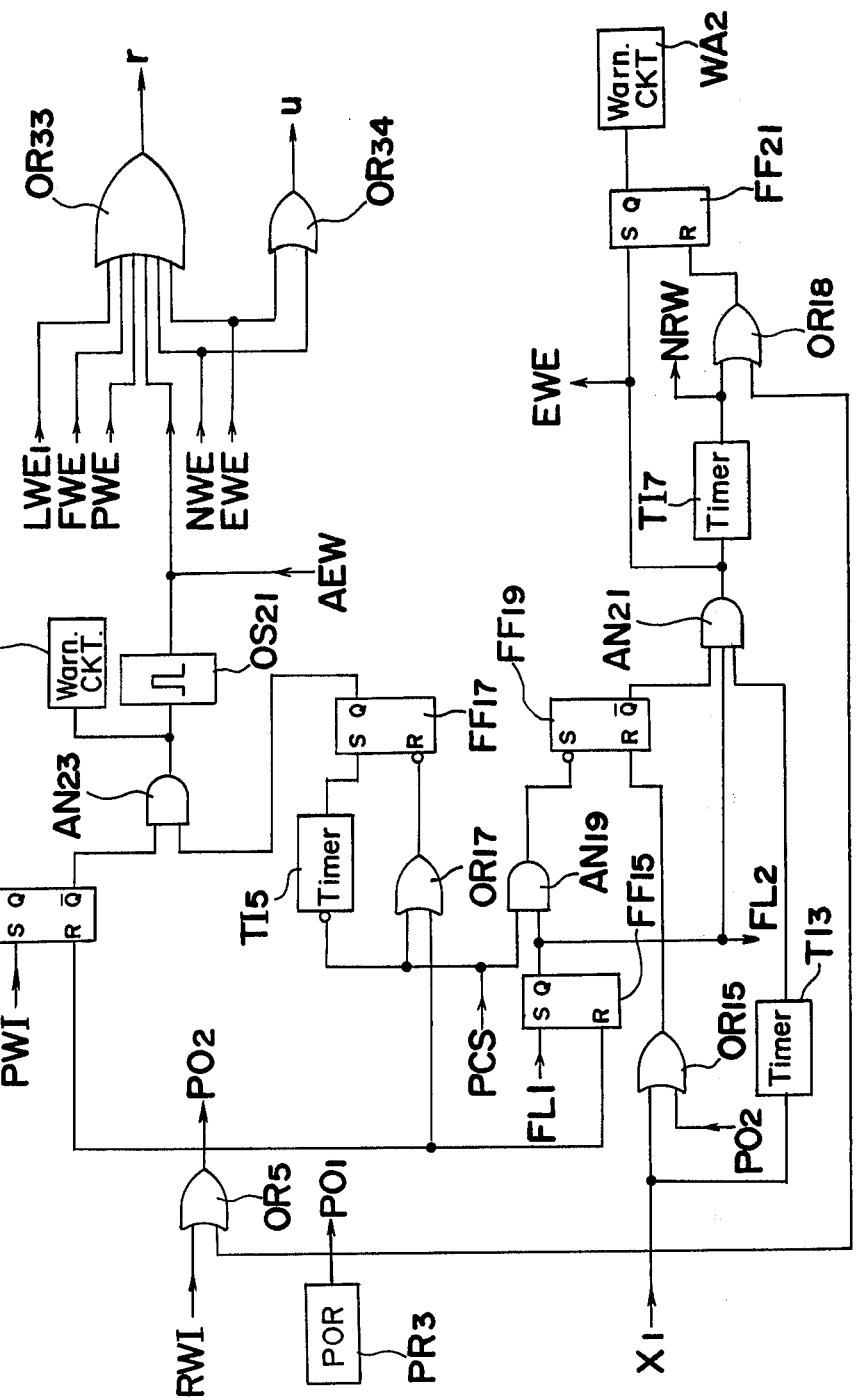
Figure 6:
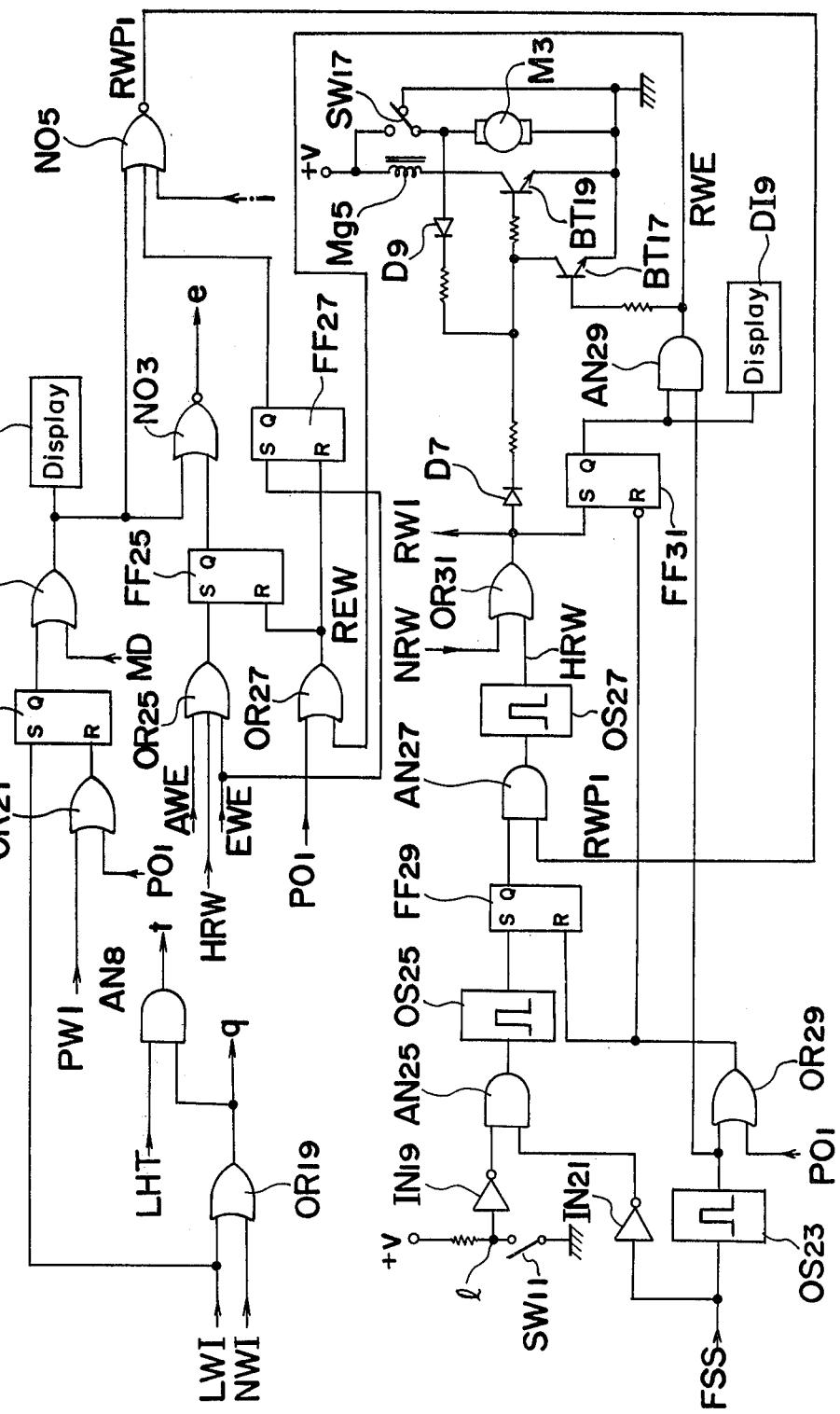
Figure 33:
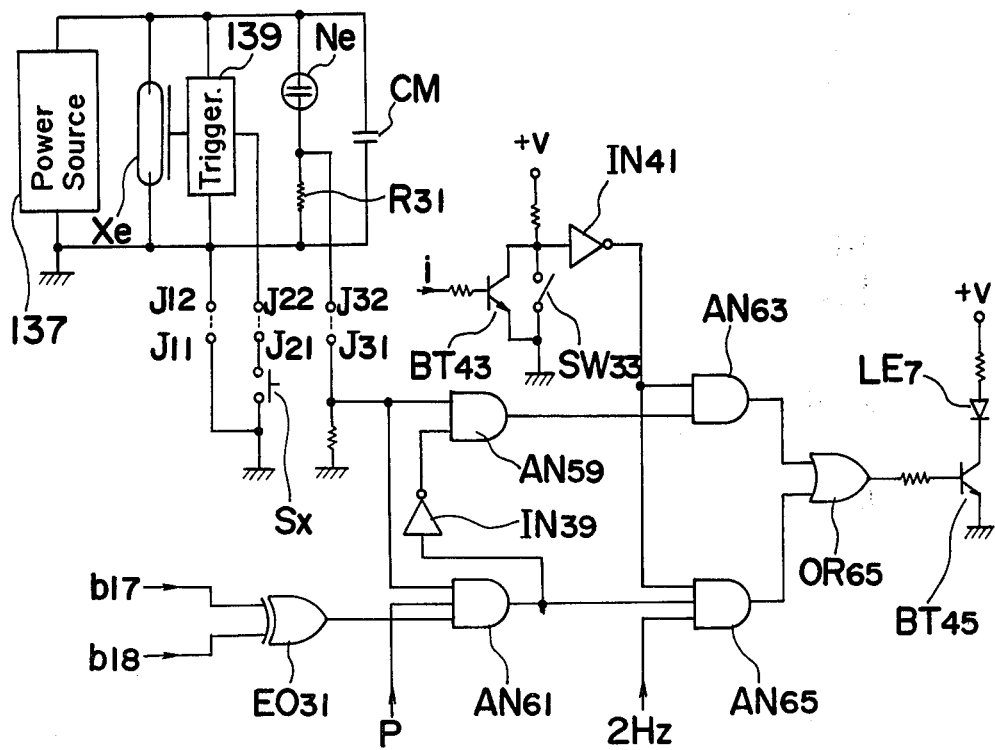
FIG. 33 is a circuit diagram showing a film type warning system.
Figure 35:
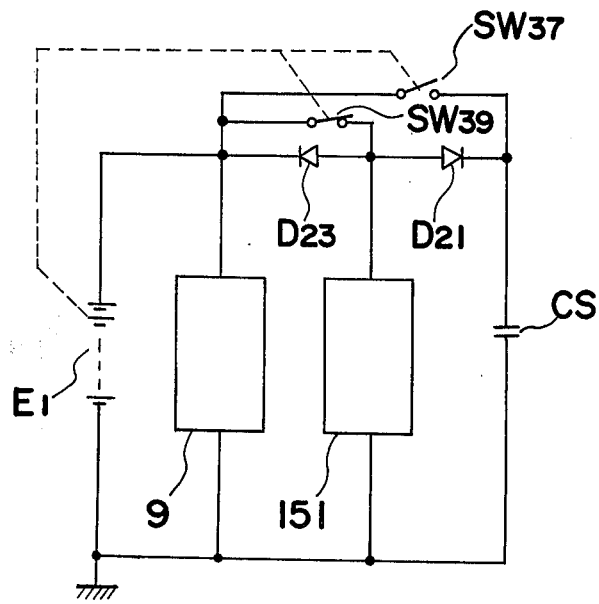
Figure 36:
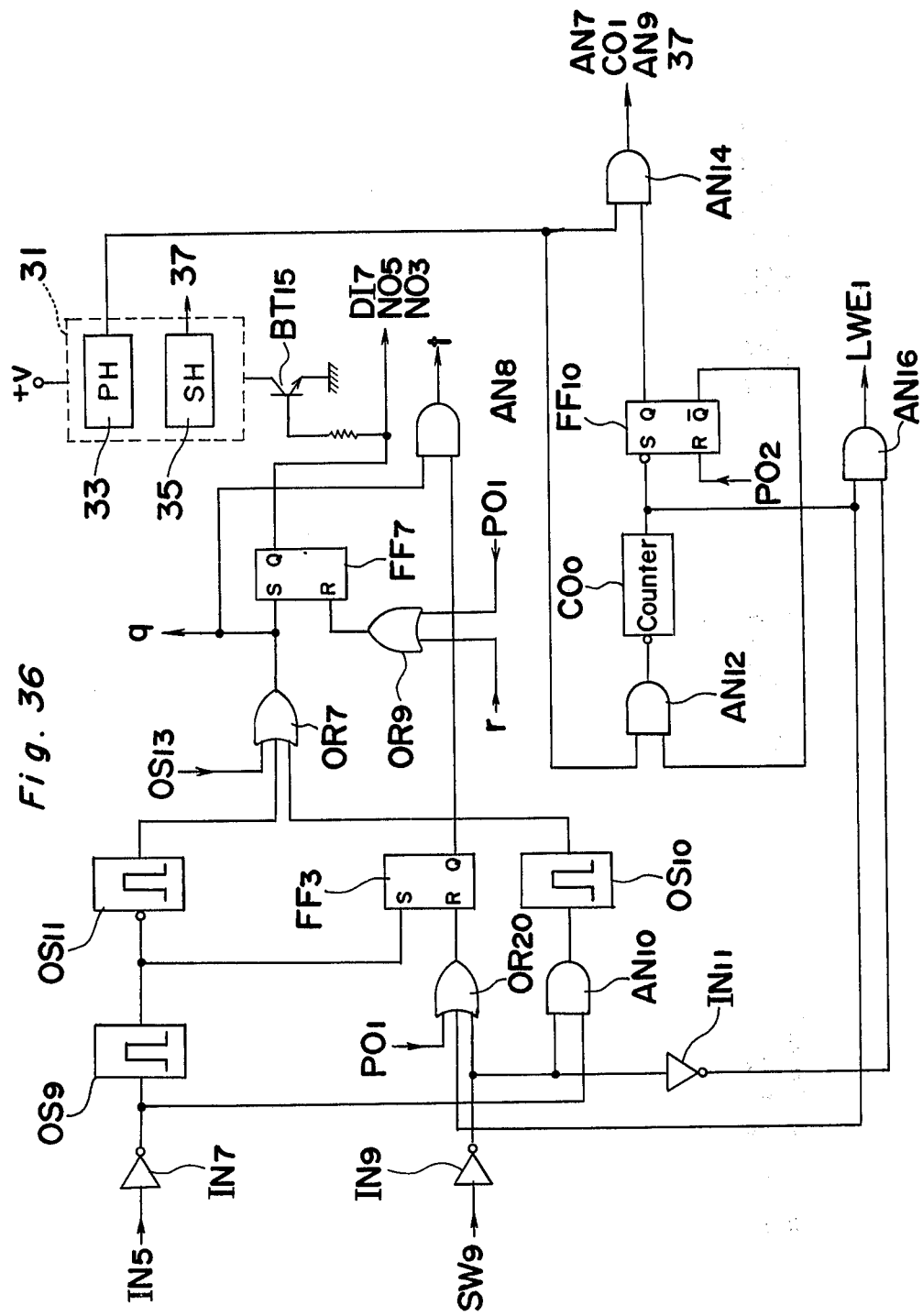
Figure 37:
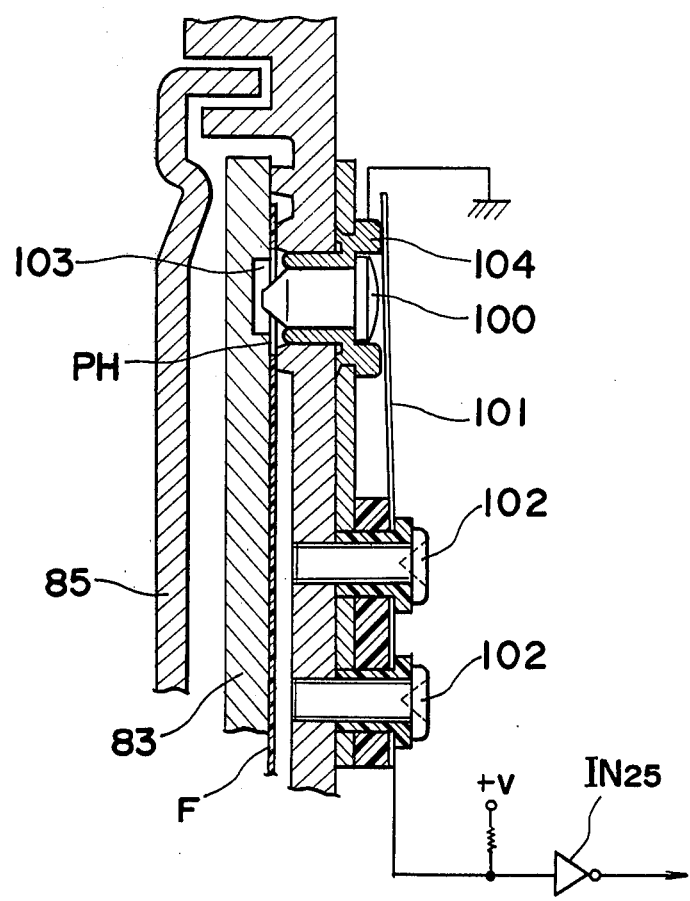

FIG.s 34 is a circuit diagram showing a modified form of the film type warning circuit shown in FIG. 33;

FIG. 35 is a block circuit diagram showing a modifed form of a power supply circuit shown in FIG. 3;

FIG. 36 is a circuit diagram showing a modified form of a circuit associated with the film loading shown in FIGS. 5 and 6; and FIG. 37 is a sectional view of a portion of the camera showing a modified form of the sprocket hole detector.

DETAILED DESCRIPTION OF THE EMBODIMENTS

Before the description of the present invention proceeds, it is to be noted that like parts are designated by like reference numerals throughout the accompanying drawings.

Figure 1:
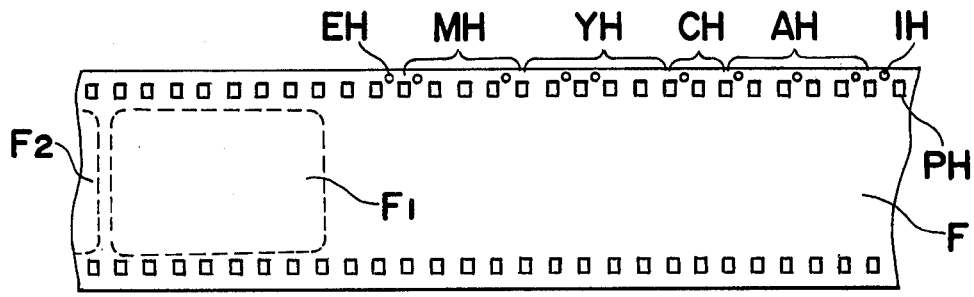
FIG. 1 is a plan view of a leader portion of a film showing coded perforations and sprocket holes.

FIG. 1 illustrates a leader portion of a film strip F which can be utilized in a photographic camera according to the present invention. As shown, the film strip F has a series of digitally coded areas IH, AH, CH, YH, MH and EH for identifying respective photographic characteristics of the film strip F. These digitally coded areas are located in the leader portion of the film strip F preceding an initial imaging area F1 which, when the film strip F has been photographically exposed and then developed, forms an initial image bearing frame. F2 represents the next succeeding imaging area on the film strip F which would form the second image bearing frame on the developed film strip. For the purpose of the description of the present invention the term "imaging area" is to be understood as convertible with the term "frame" or "film frame", and the term "frame" or "film frame" is herein frequently used, rather than the term "imaging area", to denote a respective imaging area of the unexposed film strip F.

Figure 2:
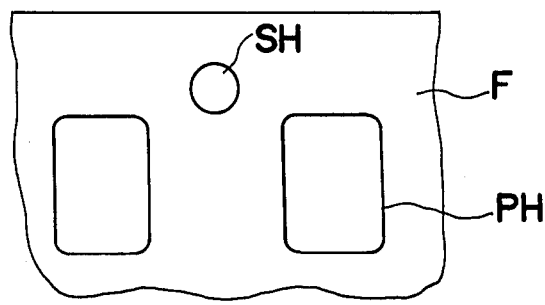
FIG. 2 is a plan view, on an enlarged scale, of a portion of the film shown in FIG. 1, showing the position of one coded perforation on the film.

The digitally coded areas IH, AH, CH, YH, MH and EH extend along a longitudinal edge of the film strip F and are defined by one or more bit regions between successive sprocket holes PH of one of the opposite rows which is adjacent to said one longitudinal edge of the film strip F. The bit regions in each of the digitally coded areas may be represented by either imperforate regions or one or more perforations SH as shown in FIG. 2, the perforations SH in one or more bit regions being in off-center longitudinal alignment with said one of the rows of the sprocket holes PH and situated adjacent said one longitudinal edge of the film strip F as best shown in FIG. 2.

So far shown in FIG. 1, the digitally coded area IH has one bit region which is perforated as shown for identifying the start of the dates representative of the photographic characteristics of the film strip F which are coded in the bit regions of the other digitally coded areas. The digitally coded area AH following the area IH with respect to the direction of advance of the film strip F in the photographic camera has 5 bit regions for identifying the speed of the film strip F, some of which bit regions are so perforated as to represent a digitally coded information of "10101" together with the imperforate bit regions in said area AH. The digitally coded areas CH on one side of the area AH opposite to the area IH has 2 bit regions for identifying the number of available frames on the film strip F, and one of the bit regions in this area CH is so perforated as to represent a digitally coded information of "01" together with the other imperforate bit region.

The digitally coded area YH has 5 bit regions for identifying the last two digits of the year forming a part of the expiration date at which the term of guarantee offered by a film manufactures as to the quality of the film strip F will expire. In this area YH so far shown, two of the bit regions are so perforated as to provide a digitally coded information of "00110" together with the other imperforate bit regions. In this example, the convention may be made that the most significant bit in the binary coded information read from the area YH stands for a decimal degit "8" or "9" when it is "0" or "1", respectively, whereas the last four significant bits in the same digitally coded information are used to denote one of the decimal digits of "0" to "9". With this convention, it will readily be seen that the digitally coded information so represented as shown reads the decimal number "86" which identifies the last two digits of the year.

The digitally coded area MH following the area YH has 4 bit regions for identifying the month forming the remaining part of the expiration date referred to above, and so far shown, two of these bit regions are so perforated as to provide a digitally coded information of "1001" together with the other imperforate bit regions in this area MH, which information reads a decimal digit "9", i.e., September.

It will, thus, readily be seen that, when the digitally coded information contained in the area YH is read in combination with that in the area MH, the year and the month of the expiration date can be identified and, in the example shown in FIG. 1, it reads "September, '86".

The digitally coded area EH positioned between the area MH and the initial frame F1 or the film strip F has one bit region which is perforated as shown for identifying the end of the date coded in the other digitally coded areas.

FIG. 3 illustrates a schematic block diagram of an electronic control circuit used in the camera according to the present invention. This control circuit shown therein comprises a battery power source E1, a light measuring switch SW1, a transistor BT1 connected in parallel with the switch SW1 for forming a part of a self-energizing circuit for keeping the battery E1 feeding the electric power to a constant voltage source once the switch SW1 has been closed, and the constant voltage source 1 operable upon closure of the switch SW1 and also during the conduction of the transistor BT1.

Figure 4:
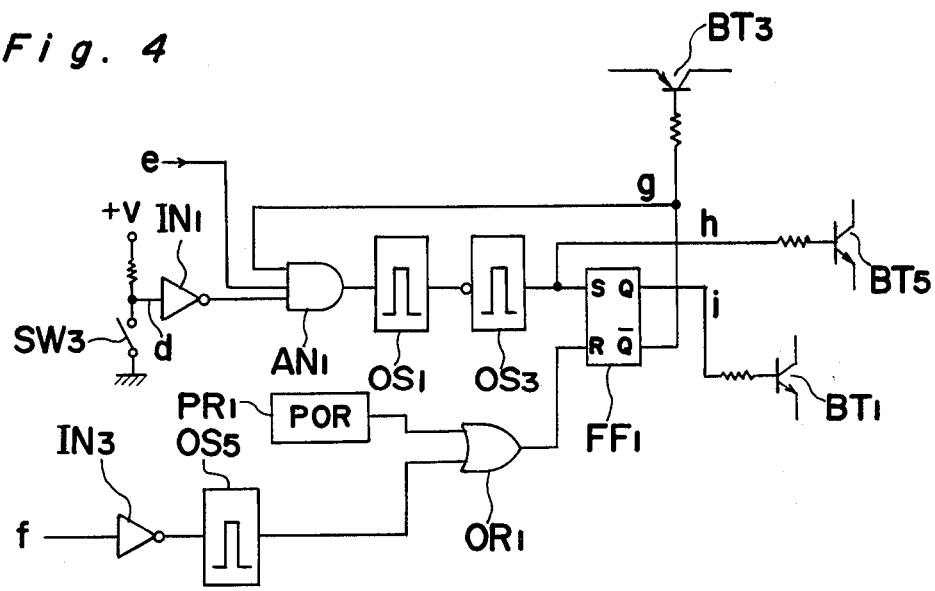
FIG. 4 illustrates the details of a release circuit shown in FIG. 3.

Reference numeral 3 represents a known light measuring, calculating and display circuit having an input terminal a for receiving an electrical signal indicative of the film speed, and output terminals b and c from which electrical signals indicative of a particular shutter speed and a particular exposure aperture emerge, respectively. A switch SW3 is a shutter release switch. Reference numeral 5 represents a release circuit for an exposure control mechanism, the details of which are shown in FIG. 4. Reference character BT3 represents a power supply transistor, and reference character Mg1 represents a release magnet of a type having a core made of a permanent magnet and operable to effect a release of the exposure control mechanism when a potential charged on a capacitor C1 is discharged through a coil of the magnet Mg1 upon conduction of a transistor BT5. Reference numeral 7 represents a known exposure control circuit operable to effect an exposure control in dependence on the signals respectively indicative of the shutter speed and the aperture value.

Reference character SW5 represents a switch capable of being closed upon completion of the exposure control operation and being opened upon completion of a charging operation of the exposure control mechanism. Reference character SW7 represents a switch capable of being opened during the loading of a roll of film strip and being closed so long as the film roll has not yet been loaded, which switch SW7 may be arranged at a film inserting area in a spool. Reference character SW9 represents a switch adapted to be closed by a back cover of the camera, and reference character SW11 represents a manually operable rewinding switch.

Reference numeral 9 represents a circuit having functions of film winding, reading of the coded perforations SH in the film strip F, preparatory or idle winding of the film strip, film rewinding and others in dependence on signals fed from respective terminals f, i, j, k and l, the details of said circuit 9 being described later with reference to FIGS. 5 and 6. When the film is loaded, a terminal t is in a low lever state with a thyristor SCR1 being consequently in non-conductive state. And, a high level pulse is generated from a terminal q to switch on a transistor BT11 so that a relay magnet Mg3 can be energized to hold a switch SW13 in a closed position, thereby causing a constant voltage source 11 to supply an electric power to a motor M1 to energize the latter. In addition, since a base current is supplied to the transistor BT11 through a diode D3, the transistor BT11 can be held in a conductive state even when the terminal q is brought into a low level state. Thus, the diode D3 as well as a diode D1 are employed for the purpose of avoiding any influence of the output from the constant voltage source 11 on the terminal q. Since the thyristor SCR1 is non-conducting at this time, the motor M1 is connected in series with a resistor R1 and, therefore, the motor M1 is driven at a low speed to effect the film winding at a correspondingly low speed. This operation can be maintained for a predetermined period of time. This means that, when the film is loaded into the camera with the back cover opened, the film can be wound preparatorily at the low speed for the predetermined period of time to permit the photographer to ascertain the correct loading of the film into the camera. This is advantageous in that any possible erroneous operation that the film not correctly loaded in the camera will not be wound preparatorily upon closure of the back cover.

When the low speed winding of the film for film loading purpose takes place for the predetermined period of time, a high level pulse is generated from a terminal r to switch transistors BT9 and BT11 on and off, respectively, thereby interrupting the low speed winding of the film. When the back cover is subsequently closed, the high level signal is again generated from the terminal q to initiate the preparatory winding of the film. However, since a terminal t is in a high level state at this time the thyristor SCR1 is brought into a conducting state and, therefore, the preparatory winding of the film takes place at a high speed. The amount of the film so wound preparatorily is such that, if it is not preset, the preparatory winding of the film is interrupted when the initial film frame is brought in register with an exposure window of the camera which is in turn aligned with the optical axis of the camera lens and such that, if it is preset, the preparatory winding of the film is interrupted when the length of the film corresponding to the present amount has been wound up. This arrangement is advantageous particularly where the film, some of the available frames of which have already been exposed, is loaded in the camera.

Thereafter, in a manner similar as in the case where a motor drive unit is operatively coupled, the charging of the exposure control mechanism and the film winding are sequentially performed each time one film frame has been photographically exposed. When the last film frame has been photographically exposed, the rewinding of the film is automatically carried out by a motor incorporated in the circuit 9, and when this rewinding has completed, a series of operations completes. However, when a switch SW11 is manually closed while the film has not been wound to the last film frame, the rewinding of the film takes place in a similar manner. It is to be noted that a mechanism is so designed as to perform the charging of the exposure control mechanism at the initial stage of rotation of the motor M1 and as to effect the film winding upon completion of the charging of the exposure control mechanism so that, so long as the motor M1 continues to rotate at the time of completion of the charging of the exposure control mechanism to continue the film winding.

A circuit encircled by the broken line 19 in FIG. 3 represents a data output block and includes a setting circuit 13 for generating an output signal indicative of the film preset by the photographer thereto and a data selector 15. This data selector 15 is so designed as to receive a data output from an output terminal FSD of the circuit 9 in dependence on a high level signal 9 in dependence on a high level signal generated from a terminal p when the presence of coded perforations SH in the digitally coded area AH on the film strip F as shown in FIG. 1 has been detected and as to receive the output signal from the setting circuit 13 when the terminal p is in a low level state, that is, the presence of the coded perforations SH in the area AH has not been detected. Reference 17 represents a digital-to-analog converter operable to convert the data from the date selector 15 into an analog signal which is in turn supplied to the light measuring calculating and display circuit 3 and a data recording circuit 21. It is to be noted each diagonal line drawn across some connection line shown in the accompanying drawings, particularly those showing respective circuit arrangements indicates the passage of an electrical signal having a plurality of bits.

Figure 7:
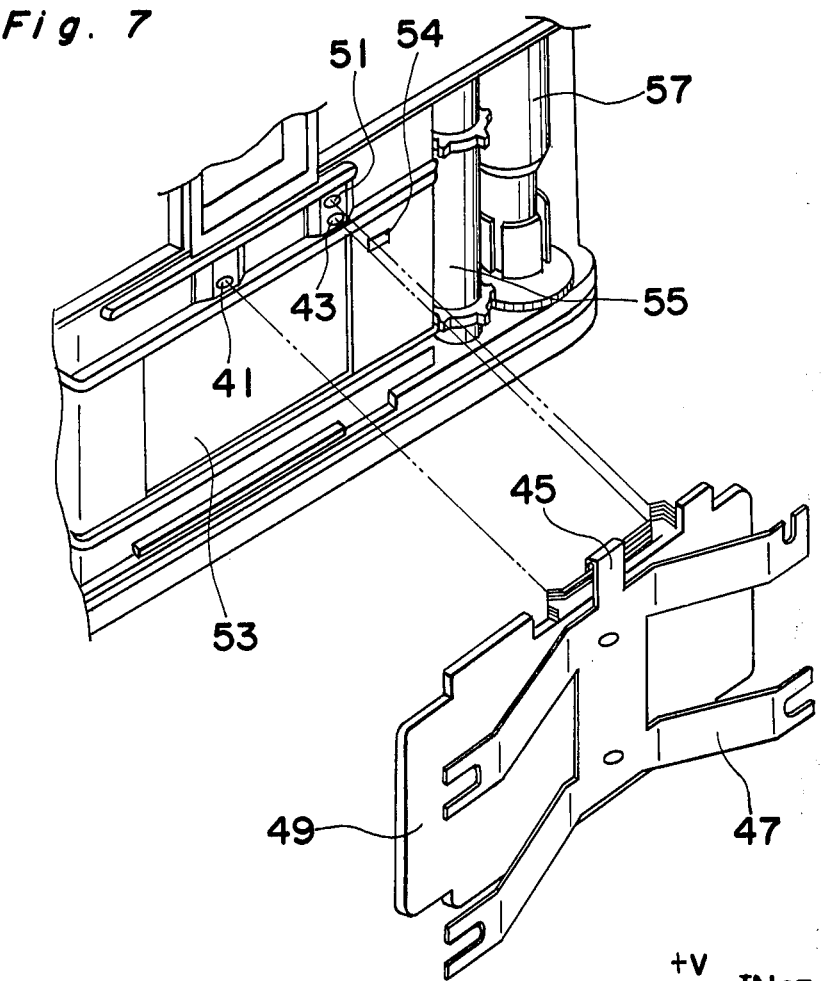
FIG. 7 is a perspective view showing a detector system for the detection of the coded perforations and the sprocket holes.

The data recording circuit 21 is operable only when a switch SW15 is closed. A data recording area of this circuit 21 is formed at 54, as shown in FIG. 7, in the camera. The position of the data recording area 54 is so selected that, as will be described later in more detail, the data recording can be initiated in dependence on a signal from a terminal u which is indicative of the completion of the film winding effected subsequent to the actual taking of a photographic picture. In this case, since the data recording is carried out from the side of an emulsion-coated surface of the film, the time required to record the data on the film can be controlled to the time adequate to the film speed. Reference numeral 23 represents a circuit for a clock having a data terminal TD from which a signal indicative of data to be recorded emerges and also a terminal TP from which a train of clock pulses to be used for timing control emerge. This circuit 23 for the clock has a liquid crystal display unit for displaying the data to be recorded on the film to the outside of the camera and a switch SW21 is adapted to illuminate such liquid crystal display unit when closed.

Reference numeral 25 represent a warning circuit operable to compare the digitally coded information representing the expiration date of the film read from the digitally coded areas YH and MH, which is fed to a terminal FDD, with the data representing the current data and fed from the circuit 23 and then to generate a warning sound in the event that the expiration date has expired. Reference character E2 represents a battery power source for the circuits 21, 23 and 25. The details of the respective circuits 21, 23 and 25 will be described later with particular reference to FIGS. 27, 28, 29 and 30.

Reference numeral 27 represents a film speed display circuit so designed as to give a blinking display of the film speed if the data fed from the data selector 15 are those corresponding to the film speed other than that of one of usually used films, for example, other than any one of ASA 100 and ASA 400, and also to give a continuous display of the film speed if the data fed from the data selector 15 are those corresponding to the film speed of any one of the usually used films. The display of the film speed is performed by a liquid crystal display unit incorporated therein and, for the purpose of illuminating this liquid crystal display unit, a switch SW23 is utilized. The details of this circuit 27 will be described later with reference to FIG. 31.

FIG. 4 illustrates the details of the release circuit 5 shown and described with reference to FIG. 3. When the constant voltage circuit 1 is brought into operation upon closure of the light measuring switch SW1 an electric power is supplied to the circuit 1 and, as a result thereof, a power-on reset circuit PR1 is operated to reset a flip-flop FF1 through an OR gate OR1. When the release switch SW3 is subsequently closed, and if a terminal e of the circuit 9 is at this time in a high level state (a signal indicative of the possibility of release, as will be described later), an AND gate AN1 generates a high level signal to a one-shot circuit OS1. In response to the positive edge of the high level signal from the gate AN1, the one-shot circuit OS1 generates a high level pulse of predetermined pulse width to a one-shot circuit OS3 which, in response to the negative edge of the high level pulse towards a low level state, generates a high level pulse. This high level pulse from the one-shot circuit OS3 is applied to the flip-flop FF1 to cause the latter to be set in response to the positive edge of the high level pulse from the circuit OS3. Accordingly, the terminal i is conditioned in a high level state, causing the power supply retaining transistor BT1 to conduct which in turn results in the terminal g brought in a low level state with the power supply transistor BT3 consequently brought into conduction. In addition, the pulse from the one-shot circuit OS3 is also supplied through the terminal h to the transistor BT5, thereby energizing the magnet Mg1 to effect the release of the exposure control mechanism. It is to be noted that the pulse width of the output pulse from the one-shot circuit OS1 is so selected as to correspond to the length of time greater than the time required for a light measuring circuit to be stabilized subsequent to the initiation of the power supply thereto. By so selecting, it is possible to avoid any possibility that the release take place upon substantially simultaneous closure of the switches SW1 and SW2 before the light measuring circuit is stabilized.

When the exposure control operation completes, as hereinbefore described, the switch SW5 is closed to allow an inverter IN3 to generate a high level signal. In response to the positive edge of the signal from the inverter IN3, one-shot circuit OS6 generates a high level pulse which is supplied through an OR gate OR1 to the flip-flop FF1 to reset the latter. In the event that the release switch SW3 remains closed at the time the terminal e is brought into a high level state incident to the completion of the film winding, the output from the gate AN1 resumes a high level state so that the release can be effected again to carry out the exposure control operation. That is, a continuous photo-taking is performed. Should the release switch SW3 be opened at the time the terminal e is brought into a high level state, the camera ceases its operation. It is to be noted that, in the circuit shown in FIG. 4, in order for the output from the gate AN1 to be in a low level state so long as a high level pulse is generated from the power-on reset circuit PR1, an output emerging through an inverter is preferably supplied to the gate AN1.

FIGS. 5 and 6 illustrates the details of the circuit block 9 shown in FIG. 3. As shown in FIG. 3, this circuit block 9 is directly connected with the battery power source E1. Accordingly, simultaneously with the loading of a power source battery E1 into a battery chamber of the camera, a power-on reset circuit PR3 generates an output signal through its output terminal PO1, which output signal serves as a reset signal for each of the circuit components of the circuits shown respectively in FIGS. 5 and 6. This signal supplied through the terminal PO1 and a rewind initiating signal RWI are supplied to an OR gate OR5, said gate OR5 generating through a terminal PO2 an output signal which also serve as a reset signal.

The operation which takes place where no film is loaded in the camera will first be described. Upon completion of the exposure control operation, the terminal f is brought into a low level state and a one-shot circuit OS13 subsequently generates a high level pulse which is supplied through a terminal NWI of an OR gate OR7 to an OR gate OR19, said OR gate OR19 generating a high level pulse through the terminal q which is in turn applied to the transistor BT11 to bring the latter in a conducting state, thereby energizing the motor M1. When the shutter charging completes subsequently, the switch SW5 is opened, thereby causing an inverter IN14 to generate a high level signal. Since the film has not loaded in the camera, the switch SW7 remains closed at this time and a terminal FSS is in a high level state. Because of this, an output from an AND gate AN16 is a high level state and, in response to the positive edge of the output from the gate AN16, a one-shot circuit OS14 generate a high level pulse which is applied through a terminal s to a transistor BT17 to cause the latter to conduct for a predetermined period of time with the transistor BT11 held in a non-conducting state, thereby bringing the motor M1 to a halt. Accordingly, where the film has not yet been loaded, the motor M1 is brought to a halt at the time the charging of the exposure control mechanism completes, without a film winding mechanism being operated. At this time, a flip-flop FF3 is reset with its $\bar{Q}$ output LHT in a high level state and, therefore, the pulse from the output terminal q is also generated from the terminal t through an AND gate AN8. In response to this pulse, the thyristor SCR1 is caused to conduct. When the thyristor SCR1 conducts in this manner, the motor M1 is driven at a high speed because the current supplied to the motor M1 no longer flows through the resistor R1.

The operation which takes place where the film has been loaded will now be described in sequence. Since the switch SW7 is opened when the film is loaded, a terminal j is in a high level state and, accordingly, an inverter IN7 generates a high level signal. In response to the positive edge of the high level signal from the inverter IN7, a one-shot circuit OS9 generates a high level pulse which is in turn applied to the flip-flop FF3 to set the latter with the terminal LHT held in a low level state. A timer TI1 serves to count a predetermined time, required for the film to be wound preparatorily for the film loading, in response to an output signal from the on-shot circuit OS9. In addition, in response to the negative edge of the output pulse from the one-shot circuit OS9, a one-shot circuit OS10 generates a high level signal through a terminal LWI, which high level signal is in turn fed through an OR gate OR19 by way of the terminal q to the transistor BT11 (FIG. 3) to cause the latter to conduct, thereby effecting the preparatory winding of the film. Yet, since the $\bar{Q}$ output LHT of the flip-flop FF3 is in a low level state at this time, the output t from an AND gate AN8 remains in a low level state and, accordingly, the thyristor SCR1 shown in FIG. 3 will not be brought into a conducting state. Therefore, the current supplied to the motor M1 flows through the resistor R1 and the motor M1 is hence driven at a low speed to effect the preparatory winding of the film at a correspondingly low speed. Unless the film preparatory winding is performed at the low speed, the photographer will be nonplused to see the film being wound at a high speed immediately after the loading of the film and/or will have his fingers cut by the longitudinal edge of the film being wound at the high speed. These disadvantages would, of course, not occure with the above described arrangement.

After the timer TI1 has counted the predetermined time, a high level pulse emerges from an output terminal LWE2 of the timer TI1 and is then applied through an OR gate OR3 to the flip-flop FF3 to reset the latter and also to a flip-flop FF5 to set the latter. However, where the switch SW9 is opened at this time because the back cover has not yet been closed, and the inverter IN11 consequently generates a high level output, the pulse from the timer TI1 passes through the AND gate AN3, emerging from a terminal LWE1 of the gate AN3. The pulse appearing on the terminal LWE1 is then passed through an OR gate OR33 and is applied through the terminal r to the transistor BT9 to bring the latter into a conducting state during the duration of the high level signal so applied, the conduction of the transistor BT9 resulting in bringing the transistor BT11 into a non-conducting state such that the motor M1 is brought to a halt.

At the same time, a flip-flop FF23 is set by a pulse LWI from an one-shot circuit OS10 with a high level signal consequently emerging from a Q output terminal of the flip-flop FF23, which high level signal is fed through an OR gate OR23 to a display circuit DI7 to cause the latter show that the film is being wound.

On the other hand, when the photographer having ascertained the loading of the film closes the back cover with the switch SW9 consequently closed, the output from the inverter IN9 is caused to be in a high level state and the output from the gate AN3 is then caused to be in a high level state. In response to the positive edge of the high level output from the inverter IN9 which is applied to a one-shot circuit OS11 through an AND gate AN5, the one-shot circuit OS11 generates a high level pulse which is in turn fed through an OR gate OR7 to a flip-flop FF7 to set the latter with a Q output of said flip-flop FF7 consequently generating a high level signal MD. The output pulse emerging from an output terminal NWI of the gate OR7, after having passed through the gate OR19, emerges from the terminal q and, therefore, the motor M1 starts it rotation. On the other hand, since an output from a $\bar{Q}$ output of the flip-flop FF3 is in a high level state, the pulse from the terminal q is generated from the terminal t through the gate AN8 and, accordingly, the thyristor SCR1 is caused to conduct to allow the current to flow therethrough to the motor M1, bypassing the resistor R1. Therefore, the film is wound preparatorily at the high speed. It is to be noted that, even if the terminal t is brought in a low level state, the thyristor SCR1 can be maintained in the conducting state by the current supplied to the motor M1. In addition, because the Q output of the flip-flop FF7 generates the high level signal MD, even when the flip-flop FF23 is reset by a signal fed from a terminal PWI, the output from the gate OR23 remains in the high level state and, accordingly, the state of the film being wound is displayed by the display circuit DI7. It is to be noted that, even after the low speed film preparatory winding has completed, the flip-flop FF23 remains set and, accordingly, the display circuit DI7 continues its display function.

When the Q output of the flip-flop FF7 generates the high level signal MD as hereinbefore described, a transistor BT15 brought into a conducting state to allow an electrical power to be supplied to a detector system shown by the broken line 31 and including a sprocket hole detector 33 and a coded perforation detector 35. The sprocket hole detector 33 generates a train of pulses of a number equal to the number of the sprocket holes PH of the film being transported whereas the coded perforation detector 35 generates a train of pulses corresponding to the coded perforation SH shown in FIG. 1. A read-out device 37 operates upon receipt of the pulse trains respectively from the detectors 33 and 35 to read out the date represented by the coded perforations SH in the film and generates from its output terminal ② a pulse resulting from the coded perforation EH, which is in turn applied to a flip-flop FF9 to set the latter with a Q output terminal p of said flip-flop FF9 consequently generating a high level signal. The details of the detectors 33 and 35 and that of the read-out device 37 will be described later with reference to FIGS. 7 to 26. Of the data read out by the read-out device 37, the data FND of the number of the available film frame represented in the digitally coded area CH is displayed through a display device DI3. The data of the expiration data represented in the digitally coded areas YH and MH shown in FIG. 1 is supplied through a gating circuit GA to a warning circuit 25 shown in FIG. 3. Finally, the data of the film speed represented in the digitally coded area AH is, after having been converted through the gating circuit GA and a decoder DE into a coded information suited to the camera, supplied to the data selector 15 incorporated in the circuit 19 shown in FIG. 3.

Where the film having no coded perforation SH has been loaded in the camera, the read-out device 37 does not generate a pulse which would result from the presence of the coded perforation EH and, therefore, the flip-flop FF9 remains reset with the terminal P consequently held in a low level state. Accordingly, all of the outputs from the gating circuit GA are binary "0" and, hence, all of the outputs from the decoder DE are binary "0". At this time, it is preferred to make the display device DI3 to display indication that the film having no coded perforation SH has been used, instead of the indication of the number of the available film frames.

In the case with the film having coded perforations SH, in response to the detection of the presence of the coded perforation in the digitally coded area IH, a terminal I of the read-out device 37 is in a high level state and an AND gate AN15 is enabled on the one hand and an inverter IN15 generates a low level signal on the other hand, and therefore, an AND gate AN13 is disabled. When the presence of the coded perforation in the digitally coded area EH is subsequently detected, a pulse corresponding to the coded perforation in the area EH is generated from the terminal ② of the read-out device 37 to set the flip-flop FF9 with the consequence that the gate AN9 is opened. The train of the pulses from the sprocket hole detector 33 is then fed through the gate AN9 to a trinary counter CO5 which generates a pulse when it has counted three input pulses. This pulse from the counter CO5 is supplied through an AND gate AN15 and, then, an OR gate OR11 to the flip-flop FF11 to set the latter. On the other hand, in the case with the film having no coded perforation, an output terminal ① of the read-out device 37 remains in a low level state and, therefore, the gates AN13 and AN15 are enabled and disabled, respectively. The pulse train from the sprocket hole detector 33 is supplied to a hexadecimal counter circuit which is composed of a series-connected octal counter CO1 and binary counter CO3 and which generates an output pulse when it has counted 16 input pulses. This output pulse from the hexadecimal counter circuit is supplied through the gates AN13 and OR11 to the flip-flop FF11 to set the latter.

When the back cover is closed while the film is being wound preparatorily at the low speed, the switch SW9 is closed and the gate AN3 is disabled and, therefore, the pulse LWE2 from the timer TI1 will not emerge from the terminal LWE1 of the gate AN3. However, at the time the pulse is generated from the timer TI1 and the flip-flop FF5 is subsequently set, the gate AN5 is enabled to generate a high level signal and, therefore, the one-shot circuit OS11 generates a high level signal. Accordingly, in this case, as soon as the low speed preparatory winding of the film that takes place during the predetermined time has completed, the high speed preparatory winding of the film immediately follows.

Reference character PN represents a preset data output device from which emerges a signal indicative of the preset number of film frames to be wound preparatorily, the preset number of the film frames being displayed by a display device DI5. Where the usual film having all of its frames not yet exposed photographically is loaded, the data output device PN generates a signal representative of a binary coded information of "00-0" and a NOR gate NO1 is held in position to generate a high level signal. Accordingly, at the time the flip-flop FF11 is set, an AND gate AN16 generates a high level signal which causes a one-shot circuit OS15 to generate a high level pulse from its output terminal FWE. This high level pulse from the one-shot circuit OS15, after having passed through the OR gate OR33, emerges from the terminal r and, therefore, the preparatory winding of the film is stopped. At the same time, the high level pulse from the circuit OS15 is supplied through an output terminal FL1 of an OR gate OR13 to a flip-flop FF15 to set the latter with its Q output FL2 consequently brought into a high level state. In the manner as hereinabove described, the film can be wound preparatorily until the initial film frame F1 is brought in register with the exposure window in the camera.

Where the film having some of its film frames having been photographically exposed is loaded, the number of film frames slightly greater than the number of the exposed film frames is preset to the data output device PN and, hence, the device PN generates an output signal indicative of such number of the film frames to be advanced. At this time, the output from the gate NO1 is in a low level state and the gate AN16 is disabled while an inverter IN17 generates a high level signal to open an AND gate AN17. When the flip-flop FF11 is set and the gate AN7 is consequently enabled, the train of the pulses from the sprocket hole detector 33 is supplied through the gate AN7 to a octal counter CO6 which generates a pulse per 8 sprocket holes (corresponding to the length of one film frame) counted thereby. The signal from the counter CO6 is then supplied to a frame counter CO7 which generates a data FCD corresponding to the number of film frames advanced during the preparatory winding, the data FCD being compared by a comparator COM with the data from the output device PN. When the data FCD becomes equal to the data from the output device PN and so is detected by the comparator COM, the comparator COM generates a high level signal and, consequently, the gate AN17 generates a high level signal. This high level pulse from the gate AN17 is in turn applied to the one-shot circuit OS17 to cause the latter to generate from its output terminal PWE a high level pulse which subsequent terminal PWE a high level pulse which subsequently emerges from the terminal r through the gate OR33 and, therefore, the preparatory winding of the film is then stopped. At the same time, the high level pulse is also applied through the output terminal FL1 of the gate OR13 to the flip-flop FF15 to set the latter with its Q output FL2 consequently generating a high level signal. In the manner described above, in the case with the film having some of its film frames having been photographically exposed, the preparatory winding of the film can be effected until an unexposed film frame next to the last exposed on of said some exposed film frames is brought into register with the exposure window of the camera. This arrangement substantially eliminated the necessity of advancing the film frame to frame while the camera lens is shielded from light by a lens cap mounted thereon according to the prior art camera.

Hereinafter, the operation which takes place where the number of the film frame to be advanced greater than the number of the available film frames has erroneously been preset will be described. The output PCS from the octal counter CO6 is fed through the OR gate DR17 to the flip-flop FF17 to reset the latter and also to the timer TI5 to cause the latter to perform a counting operation for a predetermined time in response to every negative edge of the pulse from the terminal PCS. It is, however, to be noted that, during the period in which this preparatory winding takes place, the Q output EL2 of the flip-flop FF15 is in a low level state and, therefore, the pulse from the terminal PCS does not pass through the AND gate AN19. When by this preparatory winding the film is wound to the last film frame, the film is tensioned and no pulse signal resulting from the sprocket holes is generated from the sprocket hole detector 33. Accordingly, even if a predetermined time starting from the pulse generated from the output terminal PCS of the counter CO6 before the film is tensioned has lapsed, the next succeeding pulse will not be generated through the terminal PCS. Therefore, the pulse from the timer TI5 is supplied to the flip-flop FF17 to set the latter with its Q output consequently held in a high level state. On the other hand, since the output from the comparator COM is at the time in a low level state, the flip-flop FF13 remains in a low level state with its $\bar{Q}$ output held in a high level state. Therefore, an AND gate AN23 generates a high level signal and, in response to this high level signal, a one-shot circuit OS21 generates a high level pulse which in turn emerges from the terminal r after having passed through the gate OR33, resulting in that the winding operation ceases. In addition, the high level signal emerging from the gate AN23 activates a warning circuit WA1 to warn that the number of the film frames to be advanced has been erroneously preset. Meanwhile, when the film is tensioned with its movement consequently interrupted, after the counting operation performed by a timer TI3, the gate AN23 generates a high level signal from its output terminal EWE and, in response to the high level signal from the gate AN23, a timer T17 starts its counting operation. After a predetermined time counted by the timer T17, a high level signal emerges from an output terminal NRW of the timer T17 and, accordingly, an automatic film winding can be performed as will be described later.

The normal film winding operation will now be described. When the preparatory winding of the film has completed, the flip-flop FF15 is set by the pulse emerging from the output terminal FL1 of the gate OR13, thereby generating a high level signal from the Q output FL2. When the switch SW5 is closed upon completion of the operation of the exposure control mechanism, the terminal f is brought into a low level state and, consequently, the inverter IN13 generates a high level signal with which the one-shot circuit OS13 is operated to generate a high level pulse, this high level pulse subsequently emerging from the output terminal NWI of the gate OR7. This signal from the OR gate OR7 is, after having passed through an OR gate OR19 and then an AND gate AN8, outputed from the terminals q and t, thereby causing the motor M1 to rotate at the high speed resulting in that the charging of the exposure control mechanism and the film winding are performed. At the same time, the pulse from the terminal NWI sets the flip-flop FF7 and, consequently, the transistor BT15 is brought into a conducting state whereby the sprocket hole detector 33 is operated to generate the pulse train which is fed to the octal counter CO6 which generates, after having counted up to the eight pulses fed from the detector 33, a pulse from the terminal PCS, thereby advancing the number in the film frame counter CO7, the data indicative of the number in the frame counter CO7 being subsequently displayed by the display device DI1. Simultaneously therewith, since the terminal FL2 is at this time in a high level state, the pulse from the terminal PCS is allowed to pass through the AND gate AN11 to the one-shot circuit OS13. In response to the positive edge of the pulse so applied, the one-shot circuit OS13 generates from its output terminal NWE a pulse which, after having passed through the gate OR33, emerges from the terminal r, thereby interrupting the rotation of the motor M1. The pulse from the terminal NWE is also supplied through the gate OR34, thus emerging from the terminal u, and is in turn fed to the data recording circuit 21, shown in FIG. 3, to initiate the data recording on the basis of this signal from the terminal u.

Hereinafter, the operation of the winding of the last film frame will be described. When the pulse is generated from the one-shot circuit OS13 upon completion of the operation of the exposure control mechanism, this pulse is fed through the OR gate OR15 to the flip-flop FF19 to cause the latter to be reset with its $\bar{Q}$ output held in a high level state. At the same time, the flip-flop FF16 is set by the signal from the terminal FL1 to cause the terminal FL2 to be in a high level state and, therefore, the gate AN21 is enabled. In addition, in response to the positive edge of the pulse from the one-shot circuit OS13, the timer TI3 starts its counting operation for a predetermined time. Since the film is tensioned when the last film frame is to be wound, no pulse resulting from the presence of eight sprocket holes is supplied to the counter CO6 and, therefore, before the timer TI3 generates a high level pulse upon completion of the counting operation for the predetermined time, no pulse emerge from the output terminal PCS. Accordingly, from an output terminal EWE of an AND gate AN21 emerges the pulse from the timer TI3, which pulse in turn emerges from the terminal r, thereby interrupting the winding operation. Furthermore, the pulse from the terminal EWE is outputed to the terminal u through the gate OR34, thereby causing the data recording circuit 21 to operate. In addition, a flip-flop FF21 is set by the pulse from the terminal EWE with its Q output consequently generating a high level signal which is in turn supplied to a warning circuit WA2 to operate the latter for warning that the film has been wound to the last frame. Also, a timer TI7 starts its counting operation for a predetermined time in response to the pulse from the terminal EWE. This predetermined time is longer than the time required for the data to be recorded. Upon completion of the counting operation for the predetermined time, a high level pulse emerges from a terminal NRW and, accordingly, the flip-flop FF21 is reset thereby and, at the same time, the film rewinding operation is initiated as will be described later. In the case of this last film frame, since the whole number of the film frame which have been photographically exposed have not yet wound up completely, the position at which the data has been recorded differs from that on the other images, but the data recording is with no doubt performed.

When a high level signal emerges from the output terminal NRW of the timer TI7, a pulse emerges from an OR gate OR31, which is in turn fed through a diode D7 to the transistor BT19 to switch the latter on to energize a relay magnet Mg5. Upon energization of the relay magnet Mg5, a switch SW17 is connected to the power source, thereby causing a motor M3 to rotate to effect the film rewinding, the transistor BT19 being maintained in the conducting state by the base current which has been supplied to the base thereof through the diode D7 for maintaining it in the conducting state. The pulse from the output terminal RWI of the gate OR31 is also fed to the flip-flop FF31 to set the latter and, therefore, an AND gate AN29 is enabled and, at the same time, a display device DI9 is operated to show that the film rewinding is being performed. When the film disengages from the spool, the switch SW7 is closed. Upon closure of the switch SW7, the terminal j is brought into a low level state and the output FSS of the inverter IN5 is also brought into a high level state. Accordingly, one-shot circuit OS23 generates a high level pulse which is supplied through the output terminal RWE of the gate AN29 to the transistor BT17 to switch the latter on. The switching on of the transistor BT17 brings a transistor BT19 into a non-conducting state and, therefore, magnet Mg5 is deenergized with the switch SW17 grounded to interrupt the supply of the electrical power to both of the motor M3 and the transistor BT19 to interrupt the film rewinding operation. It is to be noted that the pulse from the output terminal RWI of the OR gate OR31 is, as hereinbefore described, fed to an OR gate OR5 and subsequently emerges from an output terminal PO2, thereby serving as a reset signal for most circuit components.

The operation in which the film rewinding is effected by manually closing the switch SW11 will now be described. When the switch SW11 is closed, the terminal l is brought into a low level state and an inverter IN19 generates a high level signal. Should no film be loaded at the time the switch SW11 is closed, the switch SW11 is closed and the terminal FSS is brought into a low level state. Therefore, the inverter IN21 generates a low level signal and the output from the gate AN25 remains in the low level state. Under these circumstances, no rewinding operation takes place. However, should the film be loaded at the time of closure of the switch SW11, the output from the gate AN25 is a high level signal and the one-shot circuit OS25 generates, in response to the positive edge of the high level signal from the gate AN25, a high level pulse which is fed to the flip-flop FF29 to set the latter with the Q output consequently generating a high level signal. The output RWP1 of the NOR gate NO5 is in a low level state during the period in which the output from the gate DR23 is in a high level state, during the period in which the flip-flop FF27 is set and during the period in which the terminal i is in a high level state, and therefore, the AND gate AN27 is disabled. The period in which the output from the NOR gate NO5 is in a high level state is, when explained in connection with the operation of the camera, the period from the start of the low speed preparatory winding of the film to the start of the high speed preparatory winding of the film (i.e., the period in which the flip-flop FF23 is set), the period in which the high speed preparatory winding of the film and the normal winding operation are performed, the period from the completion of the film winding to the last film frame to the end of the film rewinding (i.e., the period in which the flip-flop FF27 is set), and the period in which the exposure control operation is performed (i.e., the period in which the terminal i is in a high level state). Accordingly, during each of these periods, the AND gate AN27 does not generate a high level signal even if the flip-flop FF29 is set.

When the flip-flop FF29 is set at a time other than any one of the above described periods, the gate AN27 generates a high level signal which is fed to the one-shot circuit OS27, resulting in the generation of a high level pulse from a terminal HRW of the circuit OS27, whereby the film rewinding operation is initiated. Upon completion of the film rewinding, the film disengages from the spool, as is the case of the normal rewinding operation, and is interrupted when a pulse is generated from the one-shot circuit OS23. It is to be noted that, since the flip-flop FF31 is reset in response to the negative edge of the pulse the OR gate OR29, the pulse from the gate OR29 undoubtedly emerges from the output terminal RWE of the gate AN29.

Where the film is not loaded, no film rewinding operation takes place as hereinbefore described. Specifically, in this case, unless the film is loaded, the terminal FSS continues to remain in the high level state and, accordingly, a low level signal is supplied to the gate AN25. Because of this, since not high level signal emerges from the gate AN25, the one-shot circuit OS25 generates no high level signal. Therefore, the flip-flop FF29 remains in the reset condition and no rewinding operation takes place, accordingly.

The release inhibiting signal which has been described as emerging from the terminal e with reference to FIG. 4 will now be described in details. As shown in FIG. 6, no release can take place because the NOR gate NO3 generates a low level signal during a period in which the OR gate OR23 generates a high level signal and also during a period in which the flip-flop FF25 is set. The period in which the gate OR23 generates the high level signal is the period from the time at which the film is loaded to the time at which the high speed preparatory winding up the film completes and the period in which the normal winding operation is carried out. On the other hand, the period in which the flip-flop FF25 is set corresponds to the period from the time at which the high level pulse emerges from the terminal AWE because the number of the film frames preset was greater than the number of the available film frame to the time at which the incident film rewinding completes, or the period from the time at which the manual rewinding of the film is initiated to the time at which the rewinding completes, or the period from the start of the automatic rewinding of the film to the end of the rewinding thereof.

Although the display devices DI7 and DI9 are used to effect display of the respective facts that the film is being wound and that the film is being rewound, these devices DI7 and DI9 may be omitted. In this case, if the reverse-flow preventing diodes D3 and D9 shown in FIGS. 3 and 6 are replaced with light emitting diodes, these light emitting diodes can be used also as display elements in such a way that, when the light emitting diodes substituted respectively for the diodes D3 and D9 are lit one at a time, respective showings can be available that the film is being wound and that the film is being rewound.

Figure 8:
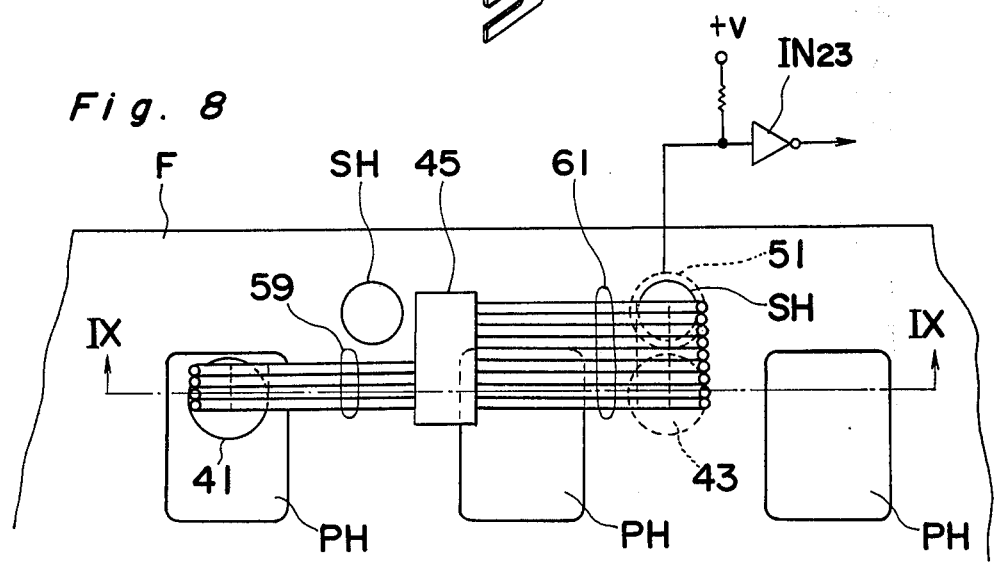
FIG. 8 is a plan view showing the detector system of FIG. 7 as viewed from a back cover.
Figure 9:
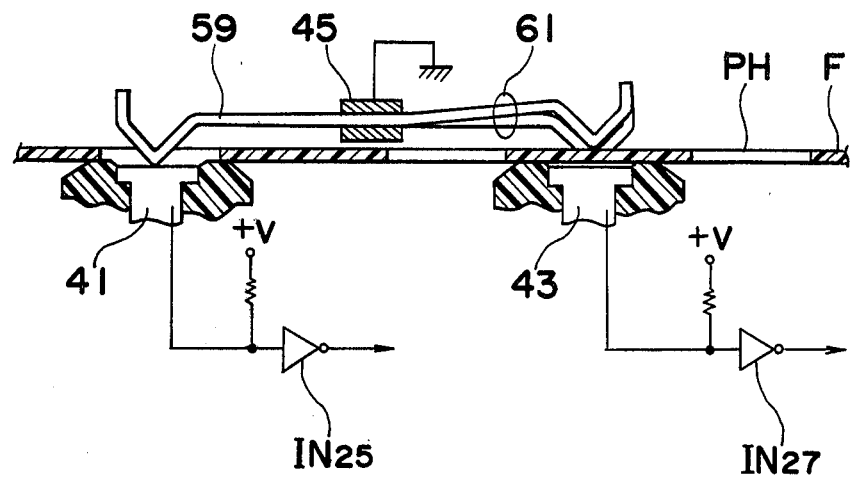
FIG. 9 is a cross-sectional view taken along the line IX—IX shown in FIG. 8.

FIG. 7 illustrates, in a perspective view, the detector system including the sprocket hole detector 33 and the coded perforation detector 35. FIG. 8 is a plan view of the detector system as viewed from the side of a pressure plate 49 while FIG. 9 is a cross-sectional view taken along the line IX—IX in FIG. 8. Reference numerals 41 and 43 represent respective electrical contacts which contact brushes 59 and 61 through the sprocket holes PH. As shown in FIGS. 8 and 9, these contacts 41 and 43 are spaced from each other a distance equal to 1.5 pitches of the sprocket holes PH. Reference numeral 51 represents an electrical contact which the contact brush 61 contacts through each of the coded perforations SH. These brushes 59 and 61 are fixed in position by means of a fixture 45 integral with a fixing spring 47 for securing the pressure plate 49 yieldably to the back cover and are electrically grounded through the fixture 45 which is also connected to earth. Referring to FIG. 7, reference numeral 53 represents the exposure window in the camera, and reference numeral 54 represents the data recording area of the data recording device 21 described with reference to FIG. 3. The spool is identified by 57 while the sprocket is identified by 55. As shown in FIGS. 8 and 9, these electrical contacts 41, 53 and 51 are connected to the power source through respective resistors and also to input terminals of the respective inverters IN25, IN27 and IN23. Accordingly, when the brushes 59 and 61 contact the associated contacts 41, 43 and 51 through the sprocket holes PH and the coded perforations SH, the inverters IN25, IN27 and IN23 generate respective high level signals.

Figure 10:
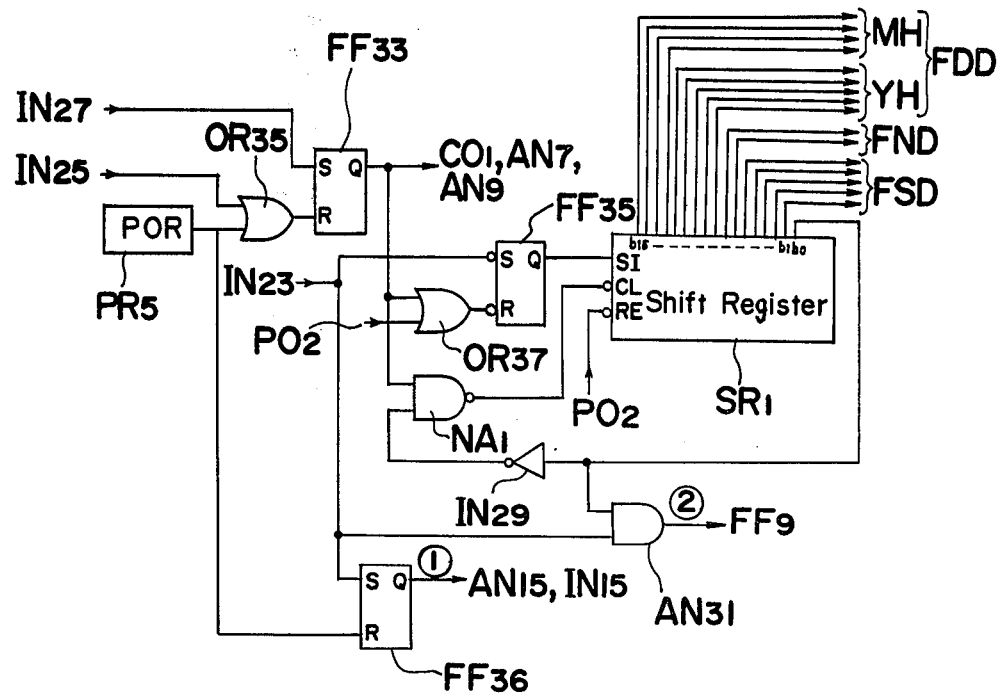
FIG. 10 illustrates the details of a sprocket hole detector, a coded perforation detector and a read-out circuit.
Figure 11:
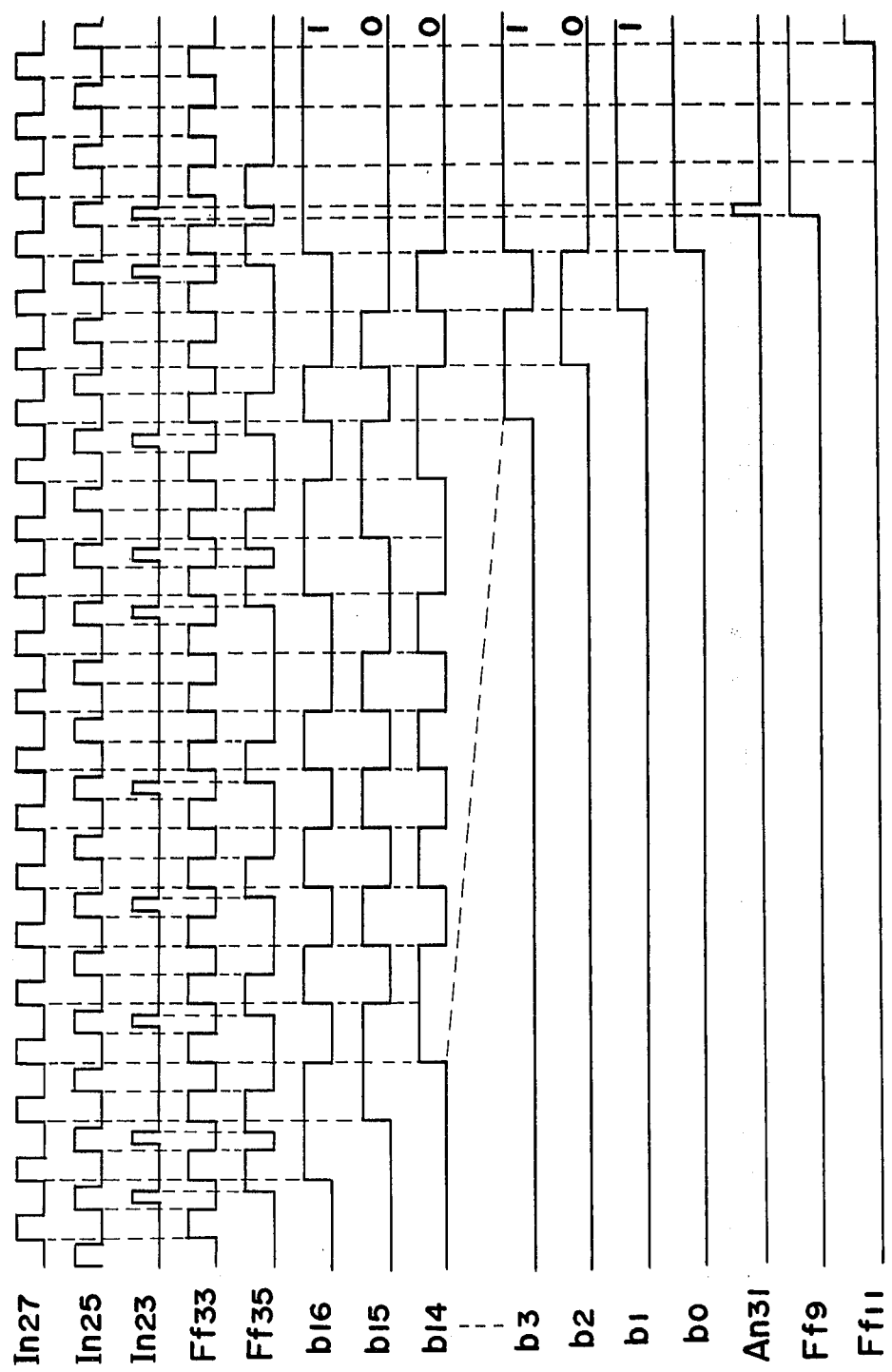
FIG. 11 is a time chart showing waveforms of various signals appearing at different locations in the circuit shown in FIG. 10.

FIG. 10 illustrates the details of a circuit for generating signals indicative of the sprocket hole and the coded perforation in dependence on the signals from the detector system shown in FIGS. 7 to 9 and a readout device (corresponding to the circuits 33 and 35 and the readout device 37 shown in FIG. 37) for reading out the data represented by these two signals. FIG. 11 illustrates a time chart showing, in timed relation, waveforms of various signals appearing in the circuit shown in FIG. 10.

The operation of the circuit shown in FIG. 10 will now be described with reference to FIG. 11. When the power supply to the detectors 33 and 35 is initiated upon conduction of the transistor BT15 shown in FIG. 5, a power-on reset circuit PR5 is operated to reset a flip-flop FF33 through an OR gate OR35. As the film moves, the inverters IN25 and IN27 generate respective trains of pulses as shown by IN25 and IN27 in FIG. 11, respectively, the pulses from the inverter IN25 being displaced half the pitch between the neighboring sprocket holes PH from the pulses from the inverter IN27. The pulse trains from the inverters IN25 and IN27 are respectively fed to the reset and set terminals of the flip-flop FF33. Accordingly, as shown by the waveform Ff33 shown in FIG. 11, the flip-flop FF33 is set in response to positive edge of each pulse from the inverter IN27 and reset in response to the positive edge of each pulse from the inverter IN25. The output signal from this flip-flop FF33 of the waveform shown by Ff33 in FIG. 11 is used as a sprocket hole signal by the reason that, where signals generated upon contact of the brushes 59 and 61 to the electrical contacts 41 and 43 are otherwise utilized, pulses of a number unnecessarily greater than the required number would be generated due to chattering to such an extent as to result in that, despite the fact that only one sprocket hole has passed, passage of two or more sprocket holes will erroneously be detected. Accordingly, by the utilization of the sprocket hole signal prepared in the manner as hereinabove described, it is possible to obtain one pulse for each sprocket hole because the output from the flip-flop FF33 will not be adversely affected even though the signals from the respective inverters IN25 and IN27 may fluctuate after having stepped up. The output from the flip-flop FF33 is then fed to the counter CO1 and the AND gates AN7 and AN9.

As has been described with reference to FIGS. 5 and 6, the film winding effected to bring the initial film frame into register with the exposure window is interrupted when the one-shot circuit OS15 generates a pulse in response to a signal based on the output from the flip-flop which is set in response to the negative edge of the sprocket hole signal indicative of the third sprocket hole from the coded perforation in the digitally coded area EH. In case of the normal film winding, the pulse from the one-shot circuit OS13 which is triggered in response to the negative edge of the sprocket hole signal indicative of the eighth sprocket hole is used to interrupt the normal film winding. Accordingly, the film is brought to a halt at which time, the brush 59 contacts the electrical contact 41 through the third sprocket hole in each film frame with respect to the direction of winding of the film.

In FIG. 10, when a flip-flop FF36 is set in response to a signal from the inverter IN23 which is indicative of the detection of the coded perforation in the digitally coded area IH with the result that the terminal ① is brought into a high level state thereby causing the AND gates AN15 and AN13 to be enabled and disabled, respectively, the circuit is brought into an operative mode for the film winding of the film having the coded perforations and operates in the manner as hereinbefore described.

A flip-flop FF35 is set in response to the negative edge of the inverter IN23 and reset in response to the negative edge of the sprocket hole signal from the flip-flop FF33. In response to the negative edge of an output from a NAND gate NA1, that is, the positive edge of the sprocket hole signal from the flip-flop FF33, the output from the flip-flop FF35 is taken into a shift resistor SR1, the data so taken in the shift resister SR1 being sequentially shifted to terminals b16, b15, b14 ... b1 and b0. When the signal based on the presence of the coded perforation in the area IH has been shifted to the terminal b0, that is, when the signal based on the last one of the coded perforations in the area MH is taken in at the terminal b16, the output from an inverter IN29 is brought into a low level state and the output from the NAND gate NA1 remains in the high level state irrespective of the output from the flip-flop FF33 whereby the shift resister SR1 ceases its operation while signals based on the coded perforations in the areas IH to MH have been taken in the terminals b0 to b16. Accordingly, outputs at the respective terminals b1 to b16 of the shift resister SR1 represent a digitally coded information of "1010101001101001" corresponding to the data represented by a combination of the coded perforations in the digitally coded areas on the film shown in FIG. 1 and are maintained until the reset signal PO2 (the signal for initiating the film rewinding) from the OR gate OR5 shown in FIG. 5 is supplied to a reset terminal of the shift resister SR1. When the terminal b0 is subsequently brought into a high level state, an AND gate AN31 is enabled and the pulse from the inverter IN23 resulting from the detection of the coded perforation in the area EH is generated through an output terminal ② of the AND gate AN31 as shown by the waveform An31 in FIG. 11. In response to the pulse from the output terminal ②, the flip-flop FF9 is set as shown by the waveform Ff9 in FIG. 11, the flip-flop FF11 (FIG. 5) is, as shown by the waveform Ff11 in FIG. 11, set in response to the negative edge of the sprocket hole signal from the flip-flop FF33 indicative of the third sprocket hole, and therefore, the film winding is interrupted.

Figure 12:
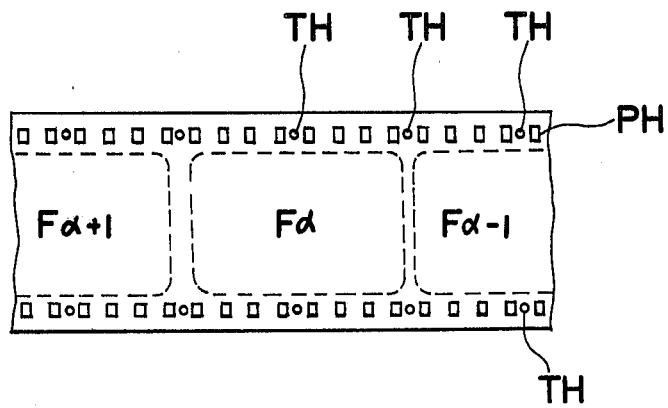
FIG. 12 is a plan view of the film showing film identifying holes formed thereon.

FIG. 12 indicates a plan view of a certain type of film. In this illustrated film, there is formed a small hole TH at intervals of each four sprocket holes PH and positioned intermediately between each neighboring sprocket holes for the purpose of film identification. Where this type of film is loaded in the camera utilizing the detector system shown in and described with reference to FIGS. 7 to 10, there will be a possibility that the small hole TH may be taken for the sprocket hole with the consequent generation of a false sprocket hole signal and, in such case, the exact film winding cannot be performed.

Figure 13:
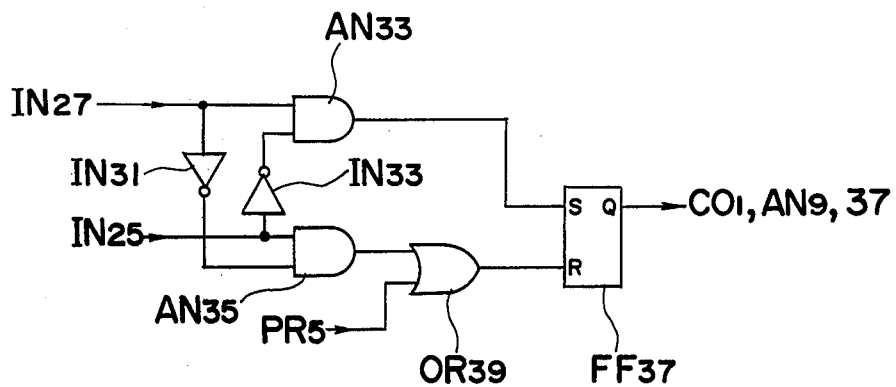
FIG. 13 is a circuit diagram showing a circuit for detecting the sprocket holes on the film shown in FIG. 12.
Figure 14:
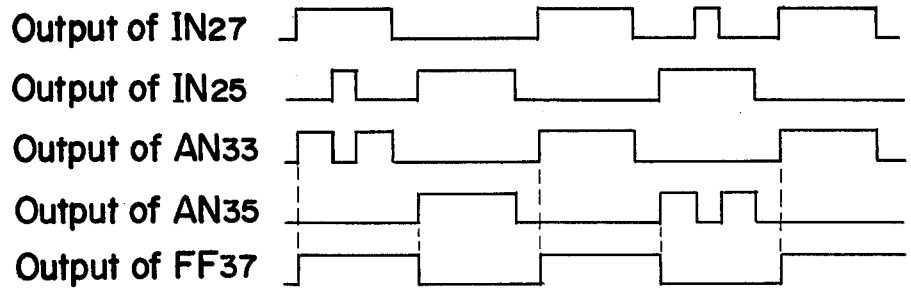
FIG. 14 is a time chart showing waveforms of various signals appearing at different locations in the circuit shown in FIG. 13.

FIG. 13 illustrates a circuit for disabling a signal resulting from the detection of the small hole TH and for outputing only the signal resulting from the detection of the sprocket holes. FIG. 14 illustrates a time chart for the circuit shown in FIG. 13.

In FIG. 9, since the film is moved rightwards, a pulse resulting from the detection of the small hole TH is outputed from the inverter IN25 and, after a predetermined time required for the hole TH to move a distance equal to 1.5 times the pitch between each neighboring sprocket holes, another pulse is then outputed from the inverter IN27. Since an AND gate AN33 receives the output from the inverter IN27 and an output from an inverter IN33 which is an inverted version of the output from the inverter IN25, an output signal which is in a low level state during the middle of the duration of the high level signal from the inverter IN27 is generated from the gate AN33 when the pulse resulting from the detection of the hole TH is outputed from the inverter IN25 as shown in FIG. 14. Similarly, an output signal which is in a low level state during the middle of the duration of the high level signal from the inverter IN25 is generated from an AND gate AN35 when the pulse resulting from the detection of the hole TH is outputed from the inverter IN27 as shown in FIG. 14. Therefore, a flip-flop FF37 is set in response to the positive edge of the high level signal from the gate AN33 and reset in response to the positive edge of the high level signal fed thereto from the gate AN35 through an OR gate OR39 as shown in FIG. 14. In view of the above, the flip-flop FF37 generates its output signal, i.e., the sprocket hole signal, which is free from any influence due to the detection of the presence of the hole TH.

FIG. 15 illustrates another embodiment of the sprocket hole detector and FIG. 16 illustrates a top sectional view of a portion of the camera in which the detector of FIG. 15 is incorporated. Referring to FIG. 15, reference numerals 63 and 67 represent respective photocouplers each having a light emitting diode LE1 or LE3 and a photo diode PD1 or PD3 incorporated therein. These photo diodes PD1 and PD3 are so positioned as to be displaced from each other a distance equal to half the pitch between each neighboring sprocket holes such that the photo diode PD3 can detect the presence of the hole TH earlier than the photo diode PD1 by a time required for the film to move a distance equal to half the pitch. Reference numerals 65 and 69 represent respective masks for increasing the accuracy of detection of the sprocket holes PH, the function of which will be described later with particular reference to FIGS. 21 to 26.

Referring to FIG. 16, reference numeral 47 represents the fixing spring, reference numeral 49 represents the pressure plate and reference numeral 83 represents an inner retaining cover. This inner retaining cover 83 has a portion 87 formed into a scattering reflective area so that light transmitted from the light emitting diodes LE1 and LE3 through the sprocket holes PH will not be reflected towards the associated photo diodes PD1 and PD2 by the surface of the inner retaining cover 83 facing the film. Reference numeral 85 represents the back cover, reference numeral 81 represents a guide roller, and reference numeral 57 represents the spool having the winding motor M1 incorporated therein. Reference numerals 71, 73, 75, 77 and 79 represent a camera body, a shutter unit, a front frame, a lensmount, and a mirror box. In this arrangement, since the passage of the sprocket holes is detected by the photocouplers and the film winding is carried out by the spool, no sprocket for the detection of the length of film being wound and also for advancing the film is required. Accordingly, the arrangement shown in FIG. 16 is advantageously reduced in size and weight because the sprocket and its associated mechanism need not be employed.

Figure 18:
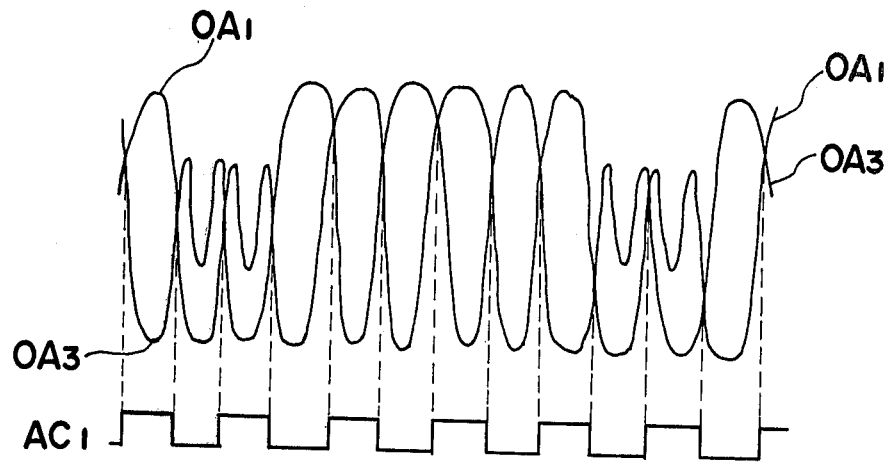
FIG. 18 is a diagram showing waveforms of various signals appearing in the circuit of FIG. 17.

FIG. 17 illustrates a circuit utilizable in association with the arrangement shown in FIG. 16 for outputing the sprocket hole signal which has not been adversely affected by the holes TH where the film of the type shown in FIG. 12 is employed whereas FIG. 18 illustrates a time chart of the output from the circuit shown in FIG. 17. Since the light emitting diodes LE1 and LE3 are driven by constant current sources CI1 and CI3, they can emit light of a predetermined intensity. An output from a light measuring circuit including the photo diode PD1, a feed-back resistor R1 and an operational amplifier OA1, and an output from another light measuring circuit including the photo diode PD3, a feed-back resistor R3 and an operational amplifier OA3 are such as shown by OA1 and OA3 in FIG. 18, respectively. Each of these outputs decreases and subsequently increases as the film is moved substantially with no light reflected from the film during the presence of the sprocket holes PH. In addition, when the holes TH are present, since each of these holes TH is smaller than each sprocket hole PH, there is available a relatively large amount of light reflected from a portion of the film around each hole TH even when the hole TH is brought to such a position as to render the light measuring circuit to generate a minimum output and, therefore, the output is of a value being larger than the output resulting from the detection of the sprocket hole PH.

Reference character AC1 represents an analog comparator for comparing the outputs from the respective light measuring circuits. Accordingly, even when the output from the operational amplifier OA3 decreases as a result of the positioning of the hole TH in register with the photo-coupler 67 when the output from the operational amplifier OA1 is decreased by the presence of the sprocket hole PH, the value so decreased is smaller than that attributable to the presence of the sprocket hole PH and, accordingly, the output OA1 becomes smaller than the output OA3, thus rendering the comparator AC1 to generate a low level signal. Similarly, even when the photo-coupler 63 detects the presence of the hole TH while the photo-coupler 67 detects the presence of the sprocket hole PH, the output OA1 is larger than the output OA3 and, therefore, the comparator AC1 generates a high level signal. Therefore, it is possible to obtain the sprocket hole signal which is not adversely affected by the presence of the holes TH.

Figure 19:
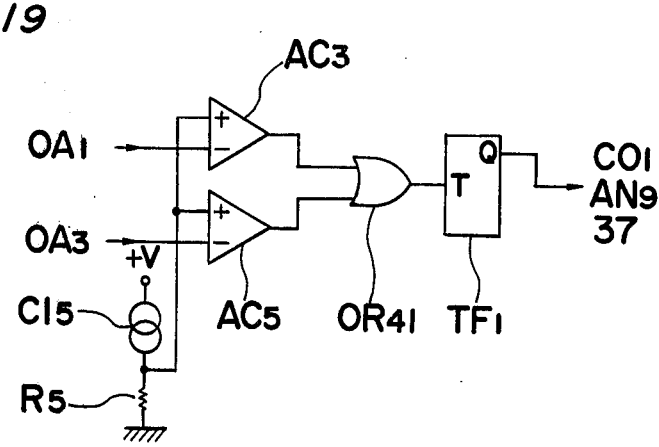
FIG. 19 is a circuit diagram showing a circuit to be connected with the detector system of FIG. 15.
Figure 20:
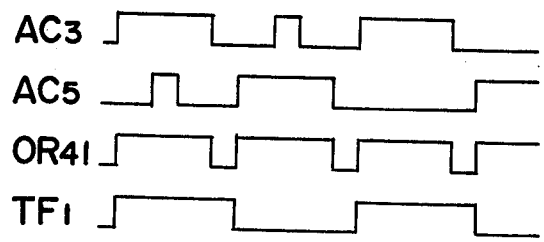
FIG. 20 is a diagram showing waveforms of respective signals appearing in the circuit of FIG. 19.

FIG. 19 illustrates a modified form of the circuit for outputting the sprocket hole signal which is not adversely affected by the presence of the holes TH. Comparators AC3 and AC5 serve to compare the respective outputs from the operational amplifiers OA1 and OA3 with a constant voltage determined by a constant current source CI5 and a resistor R5 and generate outputs AC3 and AC5, as shown in FIG. 20. These outputs AC3 and AC5 are in turn supplied to an OR gate OR41. Since the comparator AC5 generates a high level signal due to the presence of the hole TH during the period in which the output from the comparator AC3 is in a high level state due to the presence of the sprocket hole, the gate OR41 permits the passage of the signal from the comparator AC3 resulting from the presence of the sprocket hole therethrough. Similarly, even when the comparator AC3 generates the signal resulting from the presence of the hole TH while the comparator AC5 generates the signal resulting from the presence of the sprocket hole, the gate OR41 permits the passage therethrough of the signal from the comparator AC5 resulting from the presence of the sprocket hole, as shown by OR41 in FIG. 20. Accordingly, from the OR gate OR41 is generated the sprocket hole signal at a cycle equal to the time required for the film to move a distance of half the pitch between the neighboring sprocket holes. The output from this gate OR41 is supplied to a T terminal of a T-flip-flop TF1 and, accordingly, from a Q output of this flip-flop TF1 is generated a signal (shown by TF1 in FIG. 20) which corresponds to the output from the gate OR41 which has been divided by ½. If this signal from the flip-flop TF1 is used as the sprocket hole signal, any possible influence resulting from the presence of the holes TH can advantageously be eliminated.

Figure 21:
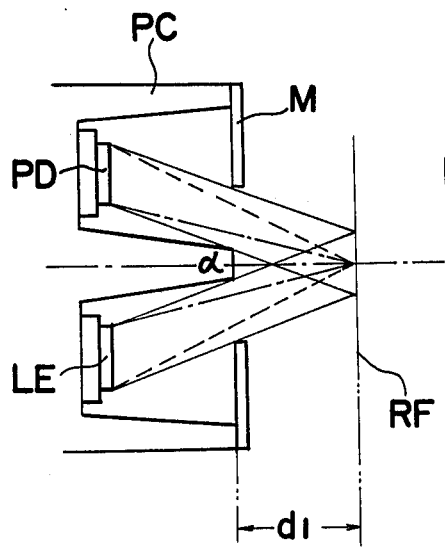
FIG. 21 to 24 are explanatory diagrams used to explain the effect derived from the use of an optical mask at a sprocket hole detecting area.
Figure 23:
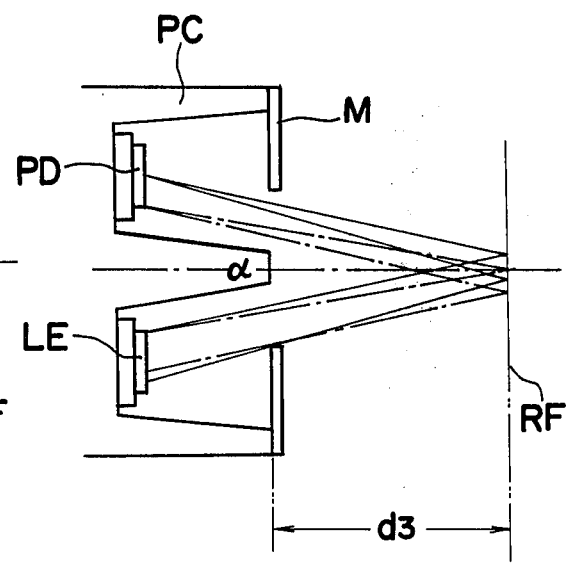
Figure 22:
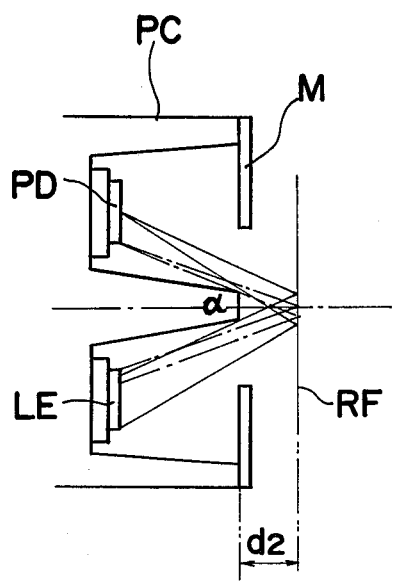

The function of the masks 65 and 69 shown in FIG. 15 will now be described with reference to FIGS. 21 to 26. FIGS. 21 to 23 illustrate how a bundle of rays of light emitted from a light emitting diode LE, after having been mirror-reflected (i.e., normally reflected) by a reflector RF, enters a photo diode PD as the distance d between a photo-coupler PC and the reflector RF changes. FIG. 25 is a graph showing change in level of the output from the photo diode PD with change in distance d, the axis of abscissa representing the distance d between the photo-coupler PC and the reflector RF while the axis of ordinate represents the relative value of the output from the photo diode PD which is attained when a predetermined current of, for example, 10 mA is allowed to flow through the light emitting diode LE.

The solid line used in FIG. 25 will first be described. This solid line represents change in level of the output from the photo diode PD exhibited when no mask M is employed. In this case, as the distance d decreases from a value, for example 8 mm, the angle at which any point on the photo diode PD stares at the light emitting diode LE increases with the corresponding increase of the amount of light received thereby. At the distance d1, the output attains the highest value and as the distance further decreases, the angle at which any point on the photo diode PD stares the light emitting diode LE is restricted by a barrier α as shown in FIG. 22, the output from the photo diode PD considerably decreases (the solid line and the solid line, and the chain line and the chain line). Accordingly, where the sprocket holes PH are to be detected with no mask M used, and assuming that light reflected from a position spaced the distance d1 away can be received when the film is present and that light reflected from a reflective surface spaced a distance d3 away can be received when the sprocket hole is present, the output obtained during the detection of the sprocket hole is about 62% of the output obtained during the presence of the film. This means that the detection precision is poor.

The broken line used in FIG. 25 represents change in level of the output from the photo diode PD exhibited when the mask M is employed for the purpose of eliminating the above described problem, i.e., for the purpose of increasing the output from the photo diode PD when the distance d takes different values. In the case of the arrangement shown in FIG. 21, there is no possibility that any point on the photo diode PD is obstructed by both of the mask M and the barrier α and, therefore, totally stares at the photo diode PD (the solid line and the broken line, and the solid line and the chain line), the output from the photo diode attaining the maximum value when the distance d is of a value d1 at which the angle at which the photo diode PD stares at the light emitting diode LE is of a maximum value. FIG. 22 illustrates the condition in which the distance d is reduced to the value d2 which is smaller than the distance d1. In the case shown in FIG. 22, the angle at which any point on the photo diode PD stares at the light emitting diode LE is reduced by the barrier α irrespective of the presence or absence of the mask M, rendering the output similar to that shown by the solid line in FIG. 25.

FIG. 23 illustrates the condition in which the distance d is increased to a value d3 which is greater than the distance d1. In the case shown in FIG. 23, the angle at which any point on the photo diode PD stares at the light emitting diode LE decreases because of the increased distance and, in addition, the light is shaded by the barrier α, and, as shown by the solid line and the solid line, and the chain line and the chain line, the number of the points on the photo diode which do not totally stare at the light emitting diode LE increases with the result that the step-down becomes steeper than in the case of the solid line (with the mask M not employed). Accordingly, if the distance between the photo coupler PC and the film is set to be of a value d1 and the distance to the reflective surface by which the light passing through the sprocket hole is reflected is set to be of a value d3, the output from the photo diode PD exhibited when the sprocket hole is detected becomes about 46% of that exhibited when the film is detected, thereby improving the detection precision as compared with the case wherein no mask is employed.

Figure 24:
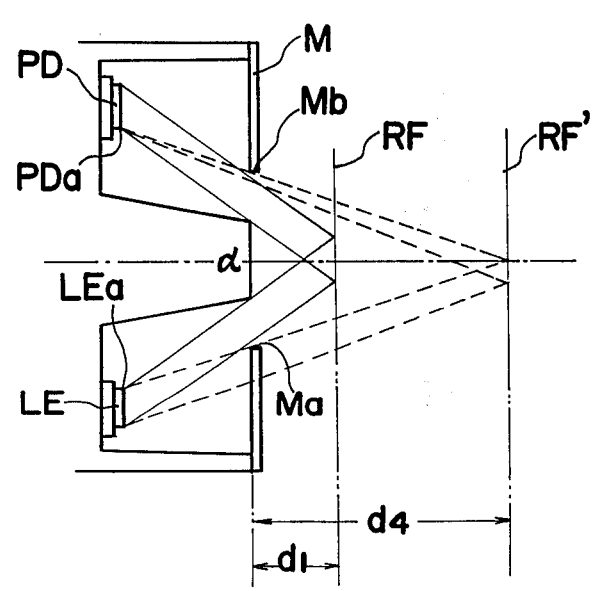
Figure 25:
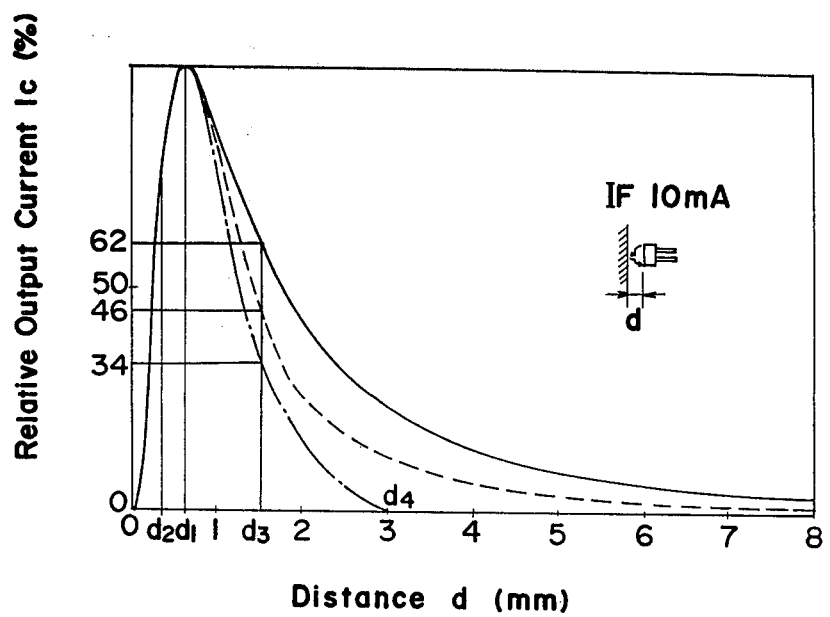
FIG. 25 is a graph used to explain the effect derived from the use of the mask.

The chain line used in FIG. 25 represents change in level of the output from the photo diode exhibited when an optical system shown in FIG. 24 is employed. In the case of the arrangement shown in FIG. 24, an end face Mb of the mask M, rather than the point PDa on the photo diode PD is closer to the barrier α and an end face Ma of the mask M, rather than a point LEa of the light emitting diode LE, is closer to the barrier α. With this construction shown in FIG. 24, the amount of light shaded is larger than that by the mask M shown in FIG. 23, and therefore, the step-down of the output from the photo diode PD becomes steeper and the output ratio of the photo diode will be 100:34 when the distance is of a value d3. Moreover, if the distance to a reflective surface RF' is of a value larger than the distance d4 as shown by the broken line in FIG. 24, light emitted from the diode LE and reflected by the reflective surface will no longer enter the photo diode PD. Accordingly, if the reflective surface by which the light passing through the sprocket hole is spaced a distance greater than the distance d4, the photo diode PD generates a zero output during the detection of the sprocket hole and, therefore, the detection precision can further be improved.

Figure 26:
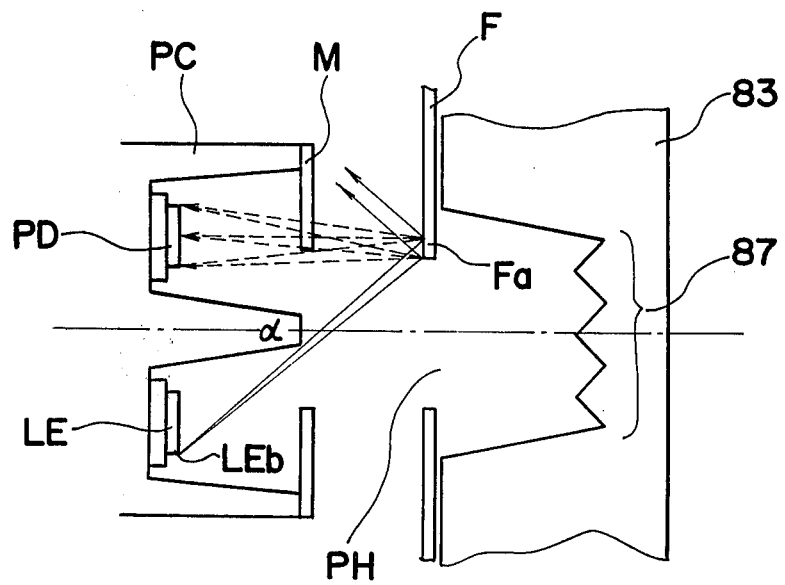
FIG. 26 is a sectional view showing the details of the sprocket hole detecting area.

Although the mirror reflection (i.e., normal reflection) has been described with reference to FIGS. 21 to 25, a usual reflective surface tends to produce not only reflected light, but also scattered light. Hereinafter, the effect derived by the use of the mask M relative to the scattered light will be described with reference to FIG. 26. FIG. 26 illustrates the condition in which one of the sprocket holes PH is brought into register with the detecting position, i.e., with the photo-coupler. Most of the rays of light emitted from the light emitting diode LE and then passing through the sprocket hole PH in the film F do not impinge upon the photo diode PD because of the scattering surface 87 in the inner retaining cover 83 and, also, most of the rays of light which have been mirror-reflected do not impinge upon the photo diode PD. On the other hand, of rays of light emitted from a point LEb on the light emitting diode LE and subsequently impinging on the surface Fa of the film, a mirror-reflected component shown by the solid line does not impinge on the photo diode PD, but a scattered component shown by the broken line impinges upon the photo diode PD. Most of this component are, as can readily be seen from FIG. 26, shielded by the mask M. Accordingly, not only does the use of the mask M improve the SN ratio of the reflected light, but it also serve to shield an unnecessary component of the reflected light, thereby increasing the power of detection of the sprocket holes as a whole.

Figure 27:
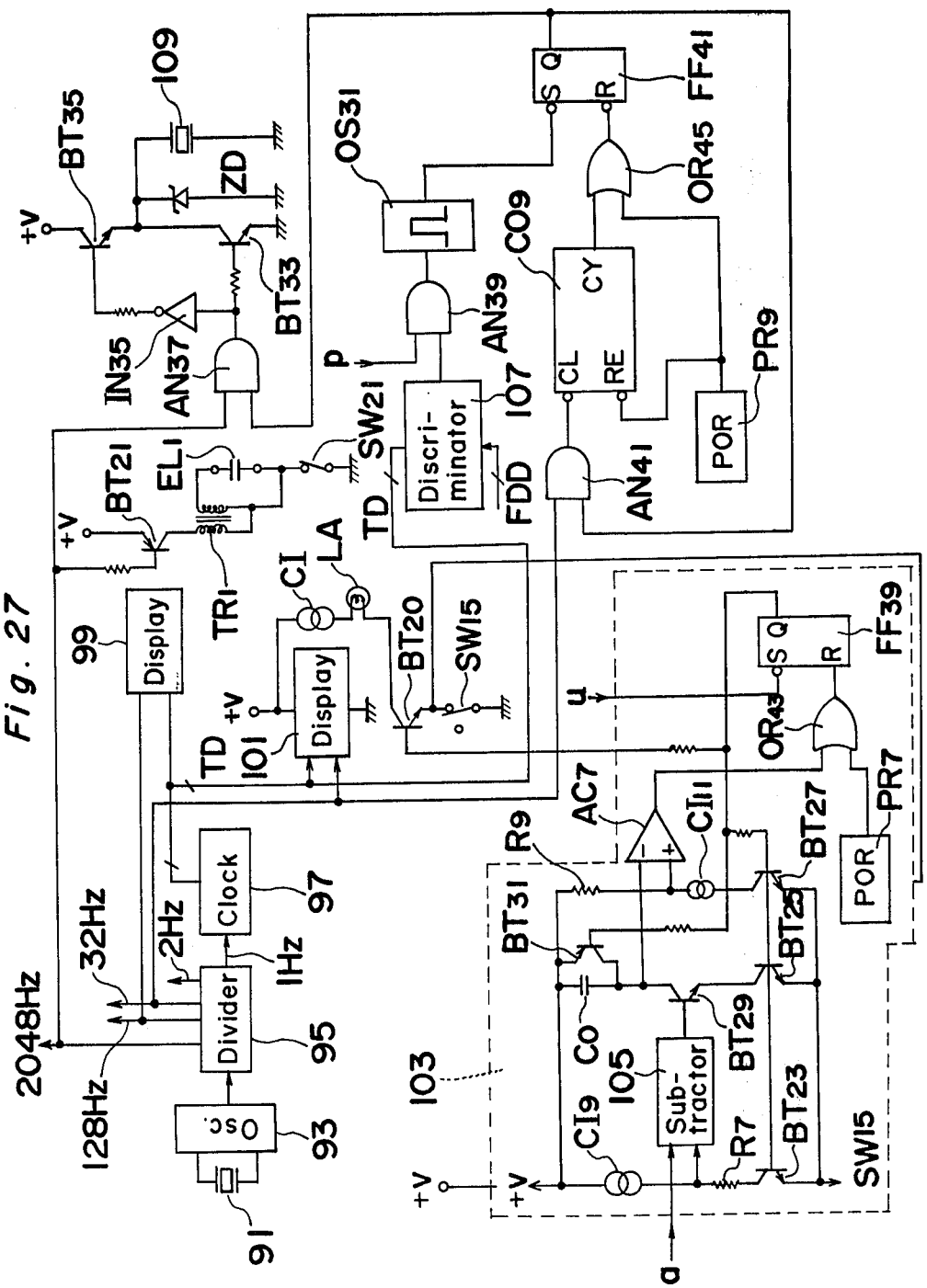
FIG. 27 illustrates the details of a date recording circuit, a clock circuit and an expiration warning circuit all shown in FIG. 3.

FIG. 27 illustrates the details of the data recording circuit 21, the clock circuit 23, and the warning circuit 25 for warning that the expiration date of the film has expired. Reference numeral 91 represents a quartz vibrator, reference numeral 93 represents an oscillator, and reference numeral 95 represents a frequency divider from which trains of clock pulses of 2048 Hz, 128 Hz, 32 Hz, 2 Hz and 1 Hz, respectively, are generated. Reference numeral 97 represents a clock circuit operable to count years, months, days, minutes and seconds on the basis of the train of the 1 Hz clock pulses fed from the divider 95. It is to be noted that, in FIG. 3, the trains of the clock pulses from the divider 95 and the data outputed from the clock circuit 97 have been generally identified by TP and TD, respectively.

The data TD from the clock circuit 97 and the train of the 128 Hz clock pulses are fed to a dynamic display circuit 99 to effect a dynamic display of the data to be recorded by means of a liquid crystal. When the switch SW21 is closed, the transistor BT21 is repeatedly brought into conducting and non-conducting states in response to the train of the 2048 Hz clock pulses to cause a transformer TR1 to generate a train of high voltage clock pulses of 2048 Hz which is in turn supplied to an EL panel EL1 to cause the latter to emit light which serves as a source of back lighting light for a dynamic liquid crystal display. The illumination by means of the EL panel is effective to provide a flat lighting and, therefore, if it is used with a liquid crystal display section overlaid thereon, no optical system such as required when a lamp is used is required and, in addition, not only can any possible uneven illumination be eliminated, but also it is effective to give a soft feeling to the eyes of the photographer. Moreover, in case of a product, such as a camera, which is desired to be light in weight and small in size, a larger effect than that afforded by a lamp can advantageously be appreciated.

Reference 101 represents a static display circuit for effecting a static display of the data from the clock circuit 97 by means of a liquid crystal. When a switch SW15 is closed during a data recording mode, a transistor BT15 is brought into a conducting state during a period in which a high level signal is generated from a time control circuit encircled by the broken line 103, to allow a current from a constant current source CI7 to flow through a lamp LA to cause the latter to emit light of predetermined intensity. By the lighting of the lamp LA, the data displayed by the static display circuit 101 can be recorded on the film. It is to be noted that an EL panel may be used as a source of light to be used for the data recording.

The operation of the time control circuit 103 will now be described. An analog signal indicative of an APEX value of the film speed outputed from the converter 17 shown in FIG. 3 is fed to the time control circuit 103 through a terminal a. This circuit 103 is activated upon closure of the switch SW15 to effect a power supply thereto and, simultaneously therewith a power-on reset circuit PR7 is oprated to reset a flip-flop FF39 through an OR gate OR43. When the flip-flop FF39 is so reset, a transistor BT31 is brought into a conducting state while transistors BT20, BT23, BT25, BT27 and BT29 are held in a non-conducting state. When the pulse from the OR gate OR34 is applied to a terminal u, the flip-flop FF39 is set in response to the negative edge of this pulse (The film winding is completely stopped.), allowing the transistors BT20, BT23, BT25, BT27 and BT29 to conduct while the transistor BT31 is brought into a non-conducting state, thereby initiating the data recording on the one hand and the counting of the recording time on the other hand. A subtractor 105, upon receipt of a predetermined voltage K, determined by a resistor R7 and a constant current source CI9, and the APEX value Sv of the film fed through the terminal a, generate a signal of a voltage equal to the difference of (K-Sv), which is in turn converted by the transistor BT29 into a current of $2^K/2^{Sv}$, this current being subsequently integrated by a capacitor Co. If the integrated voltage output decreases below the output determined by a constant current source CI11 and a resistor R9, a comparator AC7 generates a high level signal which is in turn supplied through an OR gate OR43 to the flip-flop FF39 to reset the latter, thereby interrupting the data recording. Accordingly, the data recording time can be controlled to a time which is a reciprocal proportion to the film speed.

The warning circuit for warning of the expiration of the expiration date of the film will now be described. The data indicative of the year and the month included in the data TD fed from the clock circuit 97, and the data FFD indicative of the year and the month read out from the film are supplied to a magnitude comparator 107. If the data TD from the clock circuit 97 is larger than the data FDD, the comparator 107 generates a high level signal, but if the data TD is smaller than the data FDD, it generates a low level signal. The details of this comparator 107 will be described later with reference to FIGS. 29 and 30.

When subsequent to completion of the reading of the coded area EH on the film the flip-flop FF9 shown in FIG. 5 is set with the high level signal consequently emerging from the terminal p, an AND gate AN39 is enabled When the output from the comparator 107 is subsequently brought into a high level signal, the gate AN39 generates a high level signal. In response to the positive edge of the high level output from the gate AN39, a one-shot circuit OS31 is triggered to generate a high level pulse which is in turn supplied to a flip-flop FF41 to cause the latter to be set in response to the negative edge of the high level pulse so supplied thereto. Therefore, an AND gate AN37 is enabled to allow the passage therethrough of the 2048 Hz clock pulses fed from the divider 95, so that transistors BT33 and BT35 are repeatedly brought into a conducting state and a non-conducting state, respectively, according to the frequency of the 2048 Hz clock pulses. By so doing, a warning sound is generated from a piezoelectric element 109 to indicate that the expiration date of the film has expired.

When a flip-flop FF41 is set, an AND gate AN41 is enabled to allow the passage therethrough of the 32 Hz clock pulses from the divider 95 to a counter CO9, the m-th clock pulse being subsequently generated from a carry terminal of the counter CO9. This m-th clock pulse is in turn fed through an OR gate OR45 to the flip-flop FF41 to reset the latter and, consequently, the gates AN37 and AN41 are disabled to interrupt the generation of the warning sound and also to interrupt the operation of the counter CO9. Accordingly, the warning sound is generated for a predetermined period of time after the completion of the data reading.

Figure 28:
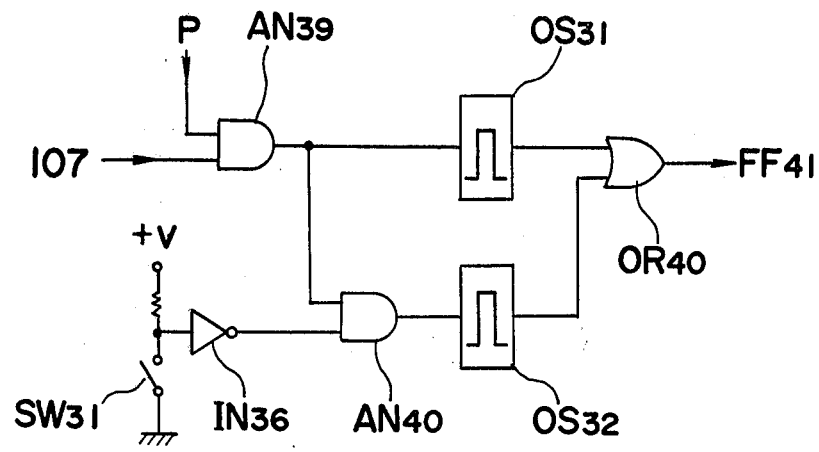
FIG. 28 illustrates a modification of the expiration warning circuit shown in FIG. 27.

FIG. 28 illustrates a modification of the circuit shown in FIG. 27. A switch SW31 used therein is adapted to be closed in association with the light measuring switch SW1. When this switch SW31 is closed, an inverter IN36 generates a high level signal. An AND gate AN40 is enabled in response to the high level signal from the inverter IN36 and, if the output from the gate AN39 is at this time in the high level state because of the expiration of the expiration date of the film, the output from this gate AN40 is brought into a high level state. A one-shot circuit OS32 is triggered in response to the positive edge of the output from an AND gate AN40 to generate a high level pulse which is in turn fed through an OR gate OR40 to the flip-flop FF41 to set the latter so that the warning sound can be generated for the predetermined period of time. In either case, a warning can be effected even when the expiration date of the film has expired while the photographer has left the film-loaded camera for a long period of time. Although in either embodiment shown in FIG. 27 or FIG. 28, the description has been made that the data fed from the clock circuit is compared with the read-out data of the film expiration date, the circuit can equally be used even in the case where the data to be recorded is of a type set manually and, in this case, the manually set data is compared with the read-out data of the film expiration date.

Figure 30:
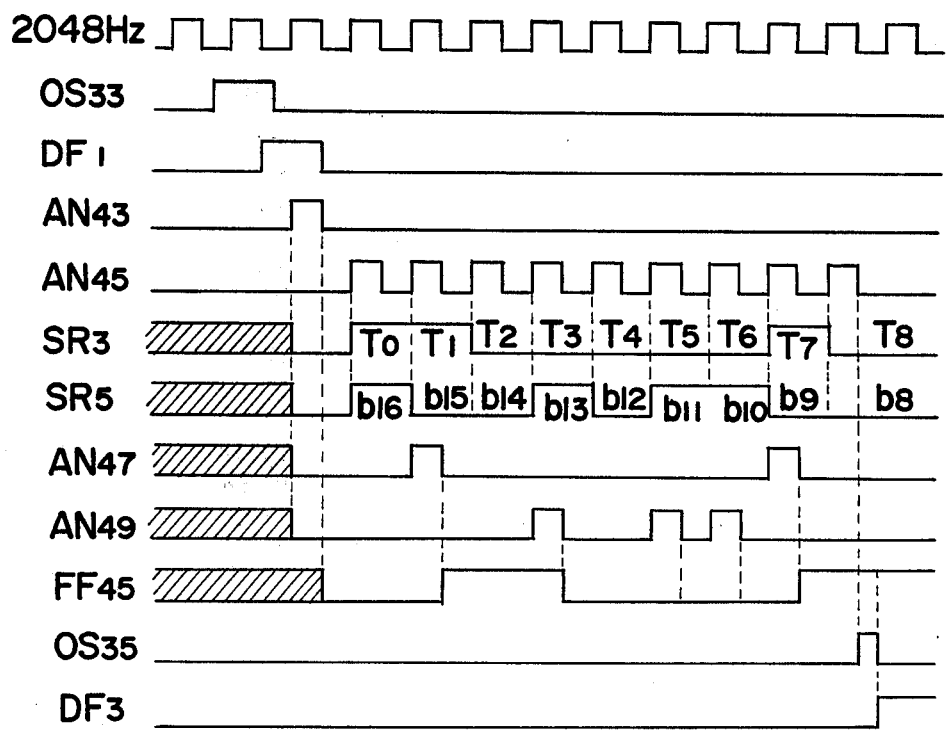
FIG. 30 is a time chart showing waveforms of respective signals appearing in the circuit of FIG. 29.
Figure 29:
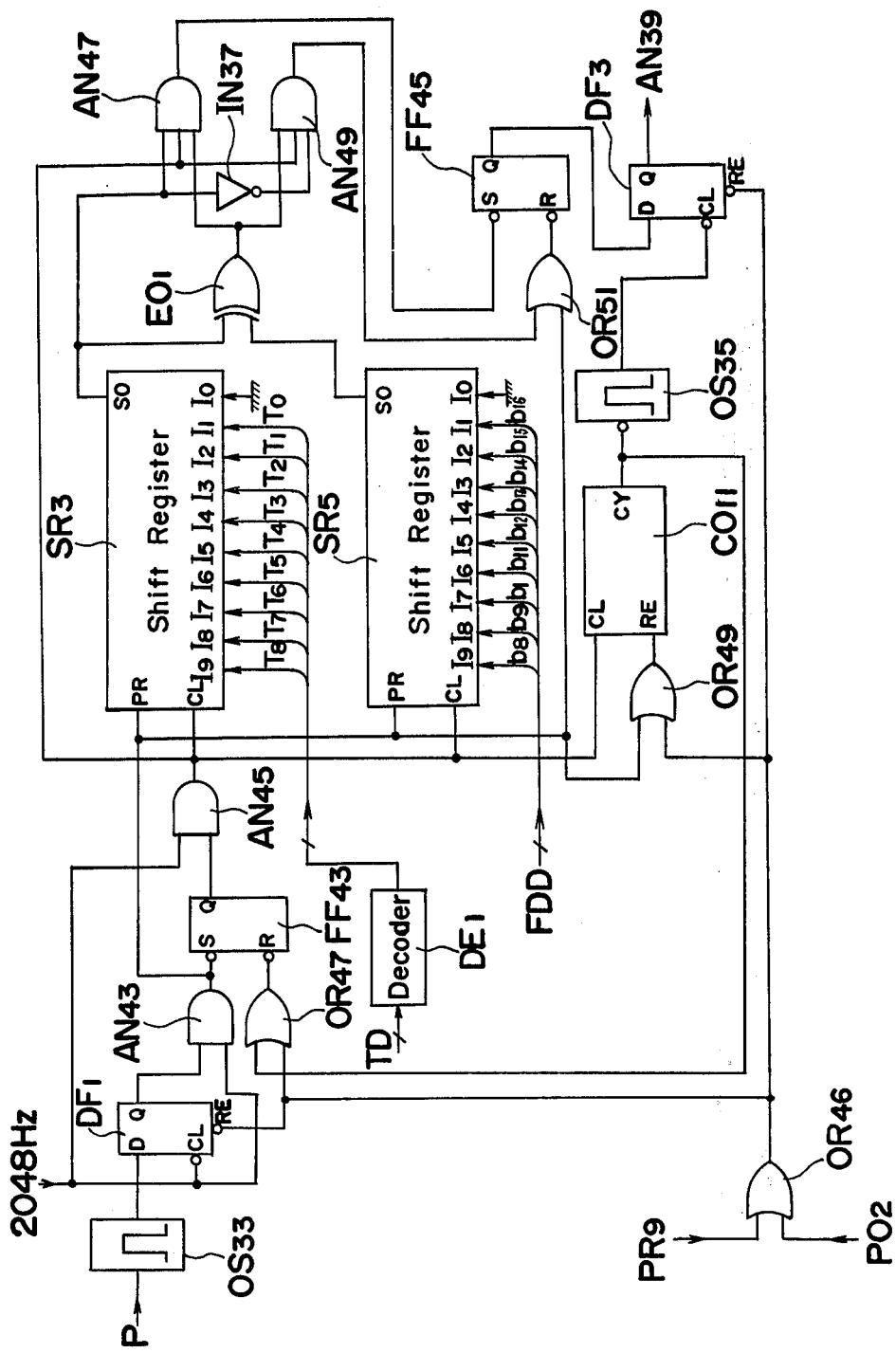
FIG. 29 is a circuit diagram showing the details of a comparing circuit shown in FIG. 27.

The details of the comparator 107 will now be described with particular reference to FIGS. 29 and 30. The data of the film expiration date in a digitally coded format is shown in Table 1.

TABLE 1

| Last two digits of the year | b8 | Last digit of the year | b9 | b10 | b11 | b12 | Months | b13 | b14 | b15 | b16 |
|---|---|---|---|---|---|---|---|---|---|---|---|
| 80 | 0 | 0 | 0 | 0 | 0 | 0 | 1 | 0 | 0 | 0 | 1 |
| 90 | 1 | 1 | 0 | 0 | 0 | 1 | 2 | 0 | 0 | 1 | 0 |
|  |  | 2 | 0 | 0 | 1 | 0 | 3 | 0 | 0 | 1 | 1 |
|  |  | 3 | 0 | 0 | 1 | 1 | 4 | 0 | 1 | 0 | 0 |
|  |  | 4 | 0 | 1 | 0 | 0 | 5 | 0 | 1 | 0 | 1 |
|  |  | 5 | 0 | 1 | 0 | 1 | 6 | 0 | 1 | 1 | 0 |
|  |  | 6 | 0 | 1 | 1 | 0 | 7 | 0 | 1 | 1 | 1 |
|  |  | 7 | 0 | 1 | 1 | 1 | 8 | 1 | 0 | 0 | 0 |
|  |  | 8 | 1 | 0 | 0 | 0 | 9 | 1 | 0 | 0 | 1 |
|  |  | 9 | 1 | 0 | 0 | 1 | 10 | 1 | 0 | 1 | 0 |
|  |  |  |  |  |  |  | 11 | 1 | 0 | 1 | 1 |
|  |  |  |  |  |  |  | 12 | 1 | 1 | 0 | 0 |

In Table 1, b8, b9, b10, b11, b12, b13, b14, b15 and b16 represent respective terminal of the shift register SR1 shown in FIG. 10 and it will readily be seen that, when the output from the terminal b8 is in a high level "1" or in a low level "0", it means of the year 1990 or 1980, respectively, that the last digit of the year which includes decimal numbers 0 to 9 is expresed by a 4-bit digitally coded information outputed from the terminals b9 to b12 and that the month which includes decimal numbers 1 to 12 is expressed by a 4-bit digitally coded information outputed from the terminals b13 to b16. The expiration date coded on the film F so far shown in FIG. 1 reads "September, 1986" as hereinbefore described and, in this case, signals emerging from the respective terminals b8 to b16 represent a digitally coded combination of "001101001". Starting from this assumption and if the data TD from the clock circuit 97 is, assumed to be, when decoded by a decoder DE1, represented by a digitally coded combination of "010000011" which read "March, 1988", the comparator 107 shown in FIG. 29 operates in the following manner.

When the signal at the terminal p steps up to a high level state upon completion of the reading, a high level pulse is generated from a one-shot circuit OS33, and is in turn taken into a D-flip-flop DF1 in response to the negative edge of the 2048 Hz clock pulses from the divider 95, an AND signal representative of the logical product of the output from the flip-flop DF1 and the 2048 Hz clock pulses subsequently emerging from an AND gate AN43. In response to the positive edge of this signal, shift registers SR3 and SR5 are operated to take in the data T8-T0 fed from the decoder DE1 and the data b8-b16 representative of the film expiration date through their respective terminals I9 to I1, respectively. A counter CO11 is at this time reset by an output from an OR gate OR49. In addition, a flip-flop FF43 is set in response to the negative edge of the output from the gate AN43, and a flip-flop FF45 is also reset through an OR gate OR51. When the flip-flop FF43 is set as hereinabove described, the gate AN45 is enabled to allow the passage therethrough of the 2048 Hz clock pulses to the shift registers SR3 and SR5 and also to the counter CO11. The shift registers SR3 and SR5 are parallel-connected and, in synchronism with the clock pulses, generate the present data sequentially through their SO (Serial Output) terminals. An exclusive OR gate EO1, AND gates AN47 and AN49 and an inverter IN37 constitute a discriminating circuit for discriminating the magnitude of a one-bit data outputed from the SO terminals of the respective shift registers SR3 and SR5. Since the respective output terminals T0 and b16 are "1", the exclusive OR gate EO1 generates a low level signal. When T1=1 and b15=0, the gate AN47 is enabled to allow the clock pulses to pass therethrough (as shown by AN47 in FIG. 30) to set the flip-flop FF45. When T3=0 and b13=1, the gate AN49 generates a pulse and, the flip-flop FF45 is, therefore, reset. Even when T5=0 and b11=1, and T6=0 and b10=1, the pulse is generated from the gate AN49, but the flip-flop FF45 remains in the reset state. When T7=1 and b9=0, the flip-flop FF45 is again set by the pulse from the gate AN45. Accordingly, where the data TD is larger and smaller, the flip-flop FF45 is set and reset, respectively (as shown by FF45 in FIG. 30). The counter CO11 generate a ninth pulse from its carry terminal, which pulse is in turn fed through the gate OR47 to the flip-flop FF43 to reset the latter, thereby disabling the gate AN45. At the same time, the one-shot circuit OS35 is triggered in response to the negative edge of the pulse from the carry terminal of the counter CO11 to generate a pulse (as shown by OS35 in FIG. 30) and, in response to the negative edge of the pulse from the circuit OS35, an output from a Q output terminal of the flip-flop FF45 is taken in a D-flip-flop DF3 thereby causing the AND gate 39 to generate a high level signal (as shown by DF3 in FIG. 30). It is to be noted that all of the flip-flops DF1, DF3 and FF43 and counter CO11 are reset by the pulse fed from the power-on reset circuit PR9 through the OR gate OR46 or the reset pulse PO2 outputed from the OR gate OR5 shown in FIG. 5. In the manner as hereinabove described, which of the two data TD and FDD is larger than the other can be discriminated.

Figure 31:
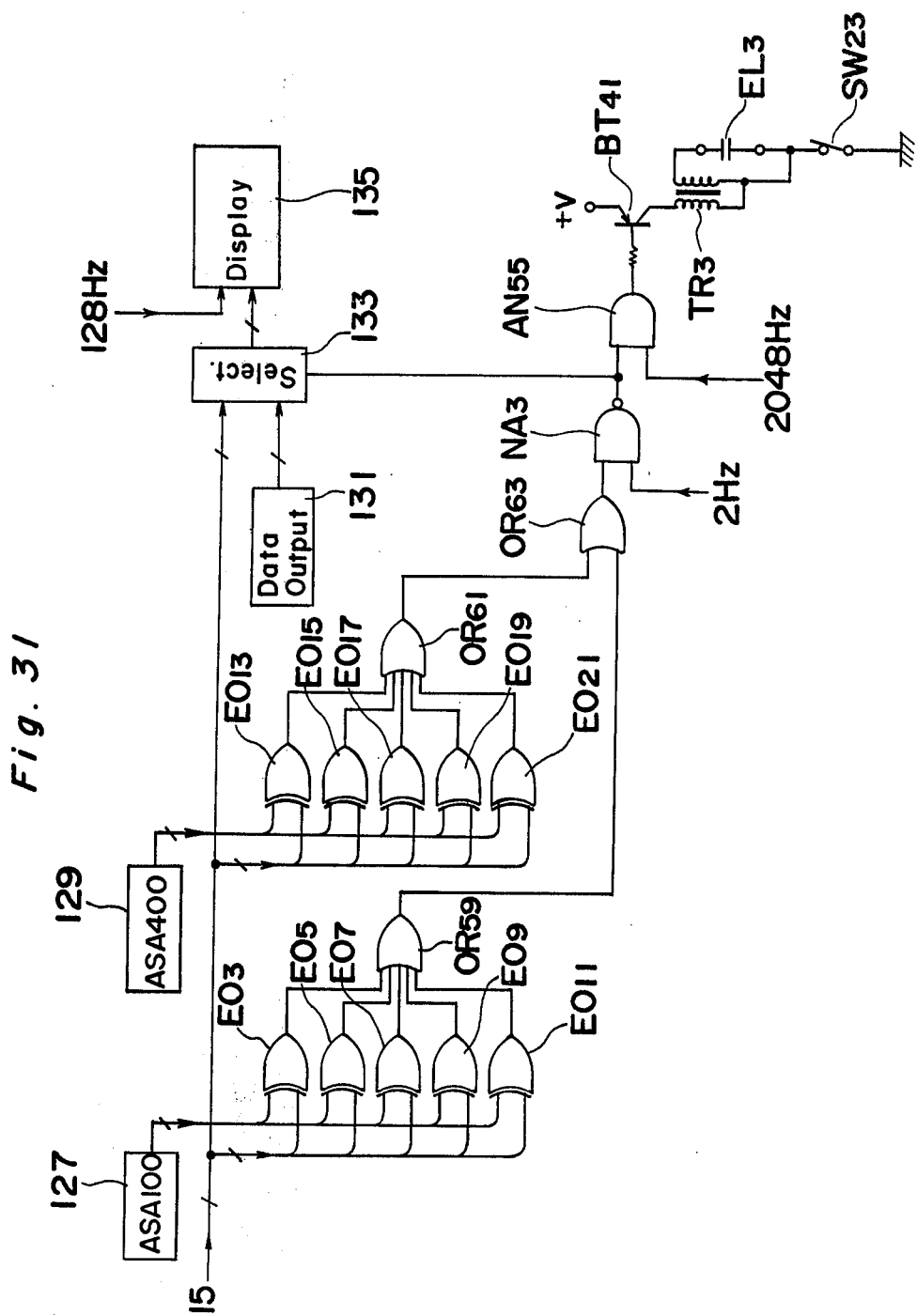
FIG. 31 is a circuit diagram showing the details of a film speed display circuit shown in FIG. 3.

FIG. 31 illustrates the details of the film speed display device 27 shown in FIG. 3. Reference numerals 127 and 129 represent data output circuits for generating respective outputs corresponding to the associated film speeds, for example, ASA100 and ASA400. The data FSD read out from the data selector 15 or the data preset in the setting circuit 13 shown in FIG. 3, and the data fed from the data output circuits 127 and 129 are compared with each other by respective comparing circuits each comprised of exclusive OR gates EO3, EO5, EO7, EO9 and EO11 or EO13, EO15, EO17, EO19 and EO21 and an OR gate OR59 or OR61, an OR gate OR63 generating a high level output when the film speed read out from the data selector 15 is neither ASA100 nor ASA400.

So long as the gate OR63 generates the high level signal, a train of clock pulses opposite in phase to the 2 Hz clock pulses fed from the divider 95 shown in FIG. 27 emerges from a NAND gate NA3. When the output from this gate NA3 is in a high level state, the data from the data selector 15 is outputed from a data selector 133, but when it is in a low level state, a blank data is outputed from a blank data output circuit 131 for causing a display device 135 to effect a blank display (i.e., to display nothing). Thus, when and so long as the data from the data selector 15 read neither ASA100 nor ASA400, the liquid crystal dynamic display circuit 135 to which the train of the 128 Hz clock pulses is applied operates to present a blinking or flashing display of the film speed, the frequency of the blinking of the display being 2 Hz. On the other hand, when and so long as the output from the OR gate OR63 is in a low level state, i.e., the data from the data selector 15 read either ASA100 or ASA400, the output from the NAND gate NA3 is always in a high level state, the consequence being that the data from the data selector 15 is outputed from the data selector 133 to cause the display circuit 135 to effect a constant display of the film speed, ASA100 or ASA400.

A switch SW23 is an illuminator switch for a display area of the liquid crystal dynamic display circuit 135. When the output from the gate NA3 is in a high level state, i.e., when the data from either the setting circuit 13 or the data selector 15 reads one of ASA100 and ASA400, an AND gate AN55 is enabled to pass the train of the 2048 Hz clock pulses therethrough to an EL panel EL3 to light the latter for illuminating the display area. On the other hand, when the train of the 2 Hz clock pulses is outputed from the gate NA3, the EL panel blinks in unison with the blinking of the display area of the display circuit 135 and, only when a numerical figure is displayed, is lit to illuminate.

As stated above, the display device is so designed that, in the case of the film of a speed, for example, ASA100 or ASA400, which is frequently used, the numerical figure reading "100" or "400" can be constantly displayed, but in the case of the film of an exceptional speed which is not used so often, the numerical figure representing such exceptional film speed is displayed in a blinking mode. Accordingly, in the case of the film of the exceptional speed, the blinking display of the numerical figure representing such exceptional film speed provides a warning that an actual taking of a photographic picture will take place using the film of the exceptional speed.

Figure 32:
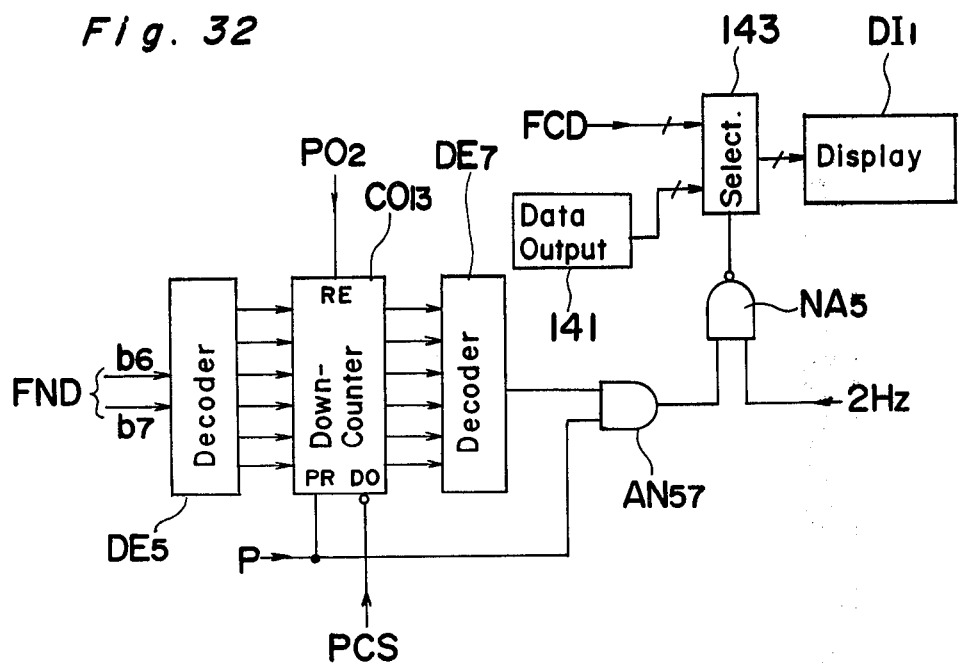
FIG. 32 is a circuit diagram showing a modified form of a film frame number display circuit shown in FIG. 5.

FIG. 32 illustrates the details of a frame number display device for displaying the available numbers of film frames. Reference character DE5 represents a decoder responsive to the outputs from the terminals b6 and b7 of the shift register SR1 shown in FIG. 10 for modifying into a digitally code corresponding to the available numbers of film frames. The relationship between inputs and outputs of the decoder DE5 is tabulated in Table 2.

TABLE 2

| b6 | b7 | Output | Available Frame No. |
|----|----|--------|---------------------|
| 0  | 0  | 001100 | 12                  |
| 0  | 1  | 010100 | 20                  |
| 1  | 0  | 011000 | 24                  |
| 1  | 1  | 100100 | 36                  |

When the terminal p is brought into a high level state upon completion of the reading, 6-bit data from the decoder DE5 is preset to a down-counter CO13 in response to the positive edge of the high level signal fed through the terminal p. Each time the film is advanced a distance corresponding to one frame on the film, the contents of the down-counter CO13 is subtracted by one in response to a pulse fed through a terminal PCS. Accordingly, the contents of the counter CO13 represent the data indicative of the available film frame number less the number of the film frames already photographically exposed. A decoder DE7 generates a high level signal when the output from the counter CO13 is "000101" to "000000", i.e., when the number of the film frame left unexposed falls within 5 to 0.

Reference numeral 143 represents a data selector which is operable to output the data FCD from the film counter CO7 shown in FIG. 5 when the output from a NAND gate NA5 is in a high level state, but to allow a data output circuit 141 for generating a blank data to generate its output when the output from the gate NA5 is in a low level state. Accordingly, when the terminal p is in the high level state while the number of the film frame left unexposed is smaller than 5, and AND gate AN57 generates a high level signal which is in turn fed to the gate NA5 to allow the passage therethrough of the train of the 2 Hz clock pulses. In response to the clock pulse train so passing through the gate NA5, the display device DI1 display in a blinking mode the number of the unexposed film frames. On the other hand, when the output from the gate AN57 is in a low level state, the output from the gate NA5 remains in the high level state and, therefore, the data FCD indicative of the numbers of the film frames left unexposed is constantly outputed from the data selector 143 which data is subsequently displayed constantly by the display device DI1.

As hereinbefore described, with this embodiment, it is possible to warn that the number of the unexposed film frames on the film is small, by allowing the display device to blink the number of the unexposed film frames when the latter has become smaller than a predetermined value.

It can be contemplated to provide coded perforations for identifying the type of a film other than those in the coded areas AH, CH, YH and MH. As is well known, the film is commercially available in any one of Type A (a tungsten type having a color temperature of 3,4000 K.), Type B (a tungsten type having a color temperature of 3,200 K.) and Type D (a daylight type having a color temperature of 5,500 K.). The following description will be made in connection with the assumption that the type-A, type-B and Type-D films are represented by respective data of "10", "01" and "00".

The type-A or type-B film is usually used for indoor photography and, in the case of the indoor photography, an electronic flash device is often inadvertently used. Considering the fact that the electronic flash device has a flash tube capable of emitting light consistent with the color temperature of the type-D film, a photographic picture taken on the type-A or type-B film by the use of such an electronic flash device will give an unnatural color representation. This problem can be avoided by incorporating the circuit shown in FIG. 33.

In the first place, since the coded perforations are increased two bits, the shift register shown in FIG. 10 must have additional two terminals b17 and b18 from which the data "10" in case of the type-A film, "01" in case of the type-B film, or "00" in case of the type-D film, is outputed. Accordingly, the output of an exclusive OR gate E031 is in a high level state in case of the tungsten type films and in a low level state in case of the daylight type film.

Referring to FIG. 33, reference numerals 137, Xe, 139 and CM represent an electrical power source for the electronic flash device, a xenon tube, a trigger circuit and a main capacitor, respectively. Reference character Ne represents a neon tube. When the voltage charged on the capacitor CM attains a predetermined value, a current flows through the neon tube Ne, and a charge completion signal is fed from a register R31 to the camera through a terminal J32 and then through a terminal J31. Terminals J21 and J22 are those through which a signal indicative of an X-contact (Sx) in the camera can be transmitted to the electronic flash device and terminals J11 and J12 are those through which the ground potential of the flash device and that of the camera are made equal to each other.

When the charge completion signal is supplied to the camera through the terminal J31 after the terminal p has been brought into the high level state upon completion of the reading and, at the same time the exclusive OR gate E031 generates the high level signal after the tungsten type film has been loaded, an AND gate AN61 generates a high level signal, and an inverter IN39 generates a low level signal accordingly. When a switch SW33 operatively associated with the light measuring switch SN1 shown in FIG. 1 is subsequently closed simultaneously with the closure of the switch SW1, an inverter IN41 generates a high level signal, and an AND gate AN65 to permit the passage therethrough of the train of the 2 Hz clock pulses to an OR gate OR65 with the consequence that a light emitting diode LE7 is activated through a transistor BT45 in a blinking mode to indicate that, while the tungsten film is loaded, a photographic picture will be taken using the electronic flash device. Since a transistor BT43 is repeatedly brought into conducting and non-conducting states one at a time in synchronism with the transistor BT1 shown in FIG. 1, an inverter IN41 continues to generate a high level signal during the period from the start of the release to the completion of the exposure control.

Where the type-D film has been loaded, the gate EO31 generates a low level signal with the inverter IN39 consequently generating a high level signal. Therefore, the gate AN59 generates a high level signal when the charge completion signal is fed thereto through the terminal J31. Subsequent closure of the switch SW33 results in generation of a high level signal from an AND gate AN63 and, therefore, through the OR gate OR65 and then the transistor BT45, the diode LE7 is lit to show that the flash device is ready to be fired.

Thus, with the embodiment shown in FIG. 33, when the charge completion signal is received from the flash device while any one of the type-A and type-B films is loaded, the diode LE7 blinks to give a warning, but when the charge completion signal is received from the flash device while the type-D film is loaded, the diode LE7 is lit constantly.

Figure 34:
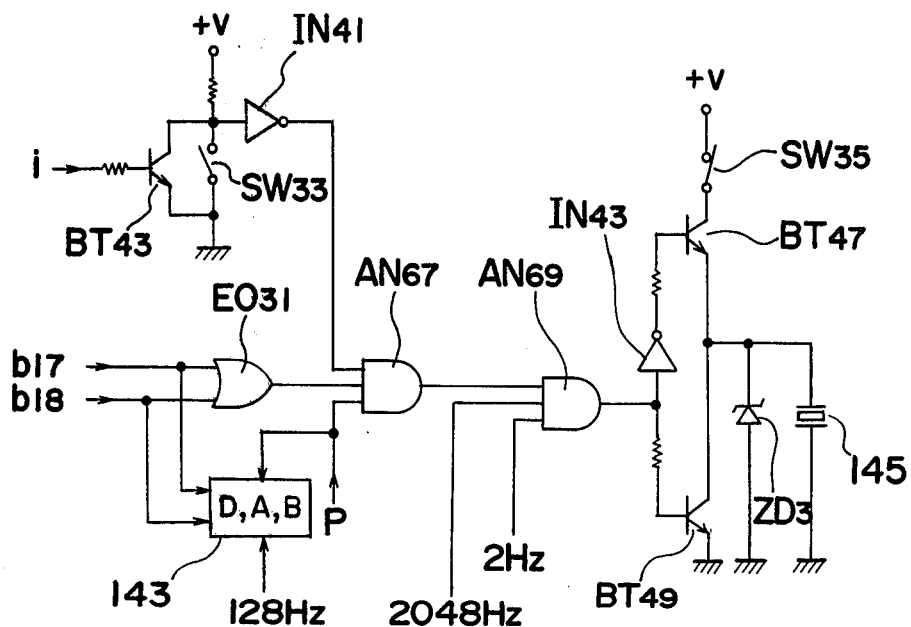

FIG. 34 illustrates another embodiment of a film type warning circuit. When the terminal p is brought into a high level state upon completion of the reading, a liquid crystal display unit 143 displays one of the dharacters "D", "A" and "B" in dependence on the data fed through the terminals b17 and b18. In the case with the tungsten type film, when an exclusive OR gate EO31 generates a high level signal and when the inverter IN41 generates a high level signal upon subsequent disclosure of the switch SW33, an AND gate AN67 generates a high level signal. Thereby, an AND gate AN69 outputs the trains of the respective 2048 Hz and 2 Hz clock pulses so that a warning sound of 2 Hz can be generated from a circuit comprised of an inverter IN43, transistors BT47 and BT49, a Zener diode ZD3 and a piezoelectric element 145. Thus, with the circuit shown in FIG. 34, not only can the type of the film loaded be displayed by the display unit, but also the warning sound can be generated simultaneously with the light measuring switch where the tungsten type film is loaded. A switch SW35 shown in FIG. 34 is a manually operable switch which is adapted to be manually opened where the warning sound is not called for.

As a modification of the circuit shown in any one of FIGS. 33 and 34, the provision may be made of a photo cell for the measurement of the color temperature of a source of light so that a warning can be performed when the color temperature so measured does not match with the data of the type of the film read out. In addition, a consistent filter may be automatically inserted in an optical system.

As shown in FIG. 1, the data showing the characteristics of the film are provided on the leader portion of the film and, therefore, when the data have been read out, the leader portion of the film where the coded perforations representative of the data are formed is wound onto the spool. Therefore, it is necessary to memorize the data once read out from the leader portion of the film. For this purpose, the shift register SR1 for the data read-out is powered by an electrical power from the battery power source E1 as shown in FIG. 3. However, when the battery E1 is removed while the film is loaded, the data stored in the shift register SR1 tends to be erased. This problem can be avoided by the use of such a circuit shown in FIG. 35.

Referring to FIG. 35, the circuit block 9 also shown in FIG. 3 includes the shift register SR1 as described with reference to FIG. 10. Reference numeral 151 represents a circuit block including the other circuit components shown in FIG. 3 than the circuit block 9. When the battery E1 is loaded, a switch SW39 is closed in response to the loading of the battery E1 and so is opened a switch SW37. Accordingly, the circuit block 151 is powered by the electrical power fed from the battery E1 through the switch SW39 while the circuit block 9 is powered by the electrical power fed directly from the battery E1. Reference character CS represents a back-up capacitor as a back-up power source adapted to be charged by the battery E1 through a diode D21. When the battery E1 is removed, the switches SW39 and SW37 are opened and closed, respectively. Therefore, when this occurs, the circuit block 9 is powered by an electrical power, charged on the back-up capacitor CS, through the switch SW37 whereas the circuit block 151 is supplied with no electrical power because of a diode D23 serving to interrupt the supply of the power thereto from the back-up capacitor CS with the elimination of any possible waste of the limited electrical power. Thus, since the electrical power supply is performed by the capacitor CS when and after the battery E1 has been removed or unloaded, the data stored in the shift register SR1 will not be erased so long as the used battery is replaced with a fresh battery before the power charged on the capacitor CS is completely consumed.

FIG. 36 illustrates a modification of that portion of the circuits of FIGS. 5 and 6 which is associated with the film loading. In the embodiment shown in FIGS. 5 and 6, it has been described that the low speed film winding is performed for a predetermined time and continues even when the back cover is closed while it is performed, during the low speed film winding, but the high speed film winding is initiated upon completion of the low speed film winding. However, in the modification shown in FIG. 36, it is possible to initiate the high speed film winding immediately after the back cover has been closed while the low speed film winding is performed to wind the film until the back cover is closed.

Referring to FIG. 36, when the film is loaded, the inverter IN7 generates a high level signal and the one-shot circuit OS9 generates a high level pulse in response to the positive edge of the high level signal from the inverter IN7. In response to the positive edge of the high level pulse, the flip-flop FF3 is set while the one-shot circuit OS11 is triggered in response to the negative edge of the high level pulse from the circuit OS9 to generate a high level pulse. The pulse from the circuit OS11, after having passed through the OR gate OR7, emerges from the terminal q and, therefore, the film winding is initiated on the one hand, and the flip-flop FF7 is set to bring the transistor BT15 into a conducting state to initiate the supply of the electrical power therethrough to the circuit 31 on the other hand. At this time, since the $\bar{Q}$ output of the flip-flop FF3 is in a low level state, the AND gate AN8 is disabled and, therefore, the pulse outputed through the terminal q is not outputed through the terminal t. Consequently, the thyristor SCR1 does not conduct and, therefore, the film winding takes place at a low speed. The pulses resulting from the passage of the sprocket holes which are outputed from the sprocket hole detector 33 are then supplied to a counter CO0 through an AND gate AN12. After a predetermined number of the sprocket holes has been counted, the counter CO0 generates a high level pulse and, if the back cover is opened at this time with an inverter IN11 generating a high level signal, the high level pulse from the counter CO0 emerges from the terminal LWE1 through an AND gate AN16, the consequence being that the film winding operation is interrupted. At the same time, a flip-flop FF11 is set with an AND gate AN14 consequently enabled to allow the passage therethrough of the pulses from the sprocket hole detector 33 which are in turn supplied to the various circuits AN7, CO1, AN9 and 37 all shown in FIG. 5. In addition, the AND gate AN12 is also disabled and, therefore, the pulses from the detector 33 will no longer be supplied to the counter CO0.

When the low speed film winding completes and the photographer subsequently closes the back cover, the inverter IN9 generates a high level signal which is applied through an OR gate OR20 to the flip-flop FF3 to reset the latter and which is also supplied to an AND gate AN10 to cause the latter to generate a high level signal. The one-shot circuit OS10 generates a high level pulse in response to the positive edge of the high level signal from the gate AN10 which, after passing through the OR gate OR7, subsequently emerges from the terminal q. At the same time, since the flip-flop FF3 is at this time reset, this high level pulse emerges also from the terminal t after having passed through the gate AN8. Therefore, as hereinbefore described with reference to FIGS. 5 and 6, the high speed preparatory winding of the film takes place until the initial film frame is brought into register with the exposure window.

On the other hand, when the back cover is closed during the low speed preparatory winding of the film, the inverter IN9 generates a high level signal and, as hereinbefore described, the high level pulse from the one-shot circuit OS10 emerges from the terminal t after having passed through the gate AN8. Therefore, the low speed preparatory winding of the film is immediately switched over to the high speed preparatory winding of the film. When the high level pulse is generated from the counter CO0 after a predetermined amount of the film has been transferred, the flip-flop FF10 is set and the gate AN14 is enabled. In addition, even when the high level pulse is generated from the counter CO0, the output from the inverter IN11 is in a low level state because of the closure of the back cover and no high level pulse emerge from the terminal LWE1. Therefore, the high speed film winding is continued and is subsequently brought to a halt when the initial film frame is brought into register with the exposure window. During the period up until the flip-flop FF10 is set and, accordingly, the film preparatory winding is interrupted, the read-out is performed in the case with the film having the coded perforations in the manner as hereinbefore described. It is to be noted that the Q output of the flip-flop FF7 is supplied to the NOR gates NO3 and NO5 of the display device DI7 shown in FIG. 6.

In the foregoing embodiment, the sprocket hole detector 33 has been described and shown as employing a brush contact system. However, it may employ a pin contact system, which will now be described with particular reference to FIG. 37.

FIG. 37 illustrates a sectional view of a portion of the camera body taken in a direction perpendicular to the direction of movement of the film F. The mechanical sprocket hole detector shown therein comprises a pin 100 accommodated in a hole in the camera body for movement in a direction perpendicular to the plane in which the film F moves and confronting the path of travel of the sprocket holes PH of one row. This pin 100 is normally urged to assume a projected position by the action of a leaf spring 102 secured to the camera body on one side opposite to the film by means of a plurality of set screws 102 in electrically insulated relation to the camera body, said leaf spring 102 being in turn electrically connected to the inverter IN25. Assuming that the film F is loaded in the camera, a rounded, or otherwise tapered, end of the pin 100 in the projected position is engaged in one of the sprocket holes PH when it is aligned with the pin 100, at which time the leaf spring 101 contacts an abutment 104 which is electrically grounded to complete a circuit through the lead spring 101. When this condition occurs, the inverter IN25 generates a high level signal.

However, as the film F is moved with an imperforate area between each neighboring sprocket holes brought into alignment with the pin 100, the pin rides on such imperforate area and is forced to move against the leaf spring 101 to a retracted position, at which time the leaf spring 101 separates from the abutment 104 thereby opening the circuit through the spring 101 with the result that the inverter IN25 generates a low level signal.

The position of the pin 100 relative to the row of the sprocket holes PH is selected in a manner similar to the photo coupler shown in FIGS. 15 and 16. It is to be noted that reference numeral 103 represents a recess defined in the inner retaining cover 83 for accommodating the rounded or tapered end of the pin 100 when the latter is in the projected position.

Although the present invention has fully been described in connection with the preferred embodiment thereof with reference to the accompanying drawings, it is to be noted that various changes and modifications are apparent to those skilled in the art. By way of example, although the data concerning the expiration date of the film has been described as read out from the associated coded perforations on the film, they may be provided on a film patrone or cartridge, or otherwise they may be manually set to the camera.

Moreover, although the data recording has been described as automatically performed by means of the clock circuit, the concept of the present invention can equally be applicable to the camera utilizing a manual data recording device.

Accordingly, such changes and modifications are to be understood as included within the true scope of the present invention unless they depart therefrom.

We claim:

1. A camera for use with a film having coded perforations at the leader portion thereof preceding an initial frame and sprocket holes along substantially the entire length of film, comprising:

a camera body having a film take-up spool, a film housing chamber, a film take-up chamber housing said film take-up spool and an exposure station provided between said two chambers and having an exposure aperture;

a camera back cover operable between an opened position for allowing the loading of the film into said camera body and a closed position for covering the film loaded in the camera body;

a pressure plate provided on said camera back cover for resiliently abutting the film at said exposure station with the film loaded in said camera body and with said camera back cover being at the closed position;

film abutting means provided at a predetermined detecting position past said exposure station so as not to interfere with said pressure plate and including an inner cover plate pivoted at said film take-up chamber and located inside said camera back cover, said film abutting means being abuttable with the film past said expsoure station and cooperable with a part of said camera body to keep the film flat at the detecting position; and means for detecting the coded perforations of the film at the detecting position for reading out information respresented by the coded perforations.

2. A camera as defined in claim 1, wherein said coded perforations detecting means includes a portion of said inner cover plate which assists the detection of the coded perforations of the film.

3. A camera as defined in claim 1, wherein each of the coded perforations is formed at a position of the film between adjacent two sprocket holes so that all of the coded perforations and the sprocket holes align in a row, and wherein said coded perforations detecting means includes;

a light emitting element fixedly arranged to emit light flux towards the row of the coded perforations and the sprocket holes so that the light flux pass through one of the coded perforations and the sprocket holes which comes to the detecting position while the light flux is reflected on a part of the film which comes to the detecting position, the part of the film being a portion located between the adjacent coded perforation and sprocket holes or a portion located between the adjacent two sprocket holes;

a light receiving element fixedly arranged to receive the light flux reflected on said part of the film; and a light shielding mask located in the path of the light flux from said light emitting element to said light receiving element from restricting the light flux received by said light receiving element.

4. A camera as defined in claim 3, wherein said light emitting element and said light receiving element are located in front of the film at the detecting position, and wherein said coded perforations detecting means further includes a partition provided between said light emitting element and said light receiving element.

5. A camera as defined in claim 4, wherein said mask has an opening of a minimum size required for only a part of the light flux from said light emitting element, that is receivable by said light receiving element after normal reflection on said part of the film, to pass therethrough.

6. A camera as defined in claim 5, wherein said light emitting element and said light receiving element are located in symmetry with one another with respect to a center line therebetween and wherein said mask is located in such a manner that its center lies on the center line and includes light shielding portions which extend nearer to the center line than said light emitting element and said light receiving element.

7. A camera as defined in claim 4, wherein said coded perforations detecting means includes a light attenuation member located behind the film at the detecting position and having a recess of a size greater than the coded perforations and the sprocket holes.

8. A camera as defined in claim 7, wherein the bottom surface of said recess is formed into a light diffusing surface.

9. A camera as defined in claim 7 or 8, wherein said inner cover plate includes said light attenuating member as an integral part thereof.

10. A camera for use with a film, comprising:
means for generating a signal of film sensitivity;
discriminating means for generating two different outputs in dependence upon whether or not said signal is consistent with a given signal of usual or standard film sensitivity;
film sensitivity display means for displaying the film sensitivity in accordance with said signal of film sensitivity; and
means for changing the displaying modes of said film sensitivity displaying means in accordance with said outputs from said discriminating means.

11. A camera as defined in claim 10, wherein said displaying modes changing means includes a circuit which causes said film sensitivity displaying means to make continuous displaying when said signal of film sensitivity is consistent with said given signal and to make intermittent displaying when said signal of film sensitivity is inconsistent with said given signal.

12. A camera as defined in claim 10 or 11, further comprising means for reading out the film sensitivity of the film, and wherein said signal generating means is connected to said film sensitivity reading out means so that said signal represents the film sensitivity read out by said film sensitivity reading out means.

13. A camera as defined in claim 12 wherein said film sensitivity reading out means includes means for detecting coded perforations formed on the film and representing film sensitivity.

14. A camera for use with a film having coded perforations at the leader portion thereof preceding an initial frame and sprocket holes along substantially the entire length of film, comprising:
a camera body having a film take-up spool, a film housing chamber, a film take-up chamber housing said film take-up spool and an exposure station provided between said two chambers and having an exposure aperture;
a camera back cover operable between an opened position for allowing the loading of the film into said camera body and a closed position for covering the film loaded in the camera body;
a pressure plate provided on said camera back cover for resiliently abutting the film at said exposure station with the film loaded in said camera body and with said camera back cover being at the closed position;
film abutting means provided at a predetermined detecting position past said exposure station so as not to interfere with said pressure plate, said film abutting means being abuttable with the film past said exposure station and cooperable with a part of said camera body to keep the film flat at the detecting position;
means for detecting the coded perforations of the film at the detecting position for reading out information represented by the coded perforations;
means for generating a signal of film sensitivity;
discriminating means for generating two different outputs in dependence upon whether or not said signal is consistent with a given signal of usual or standard film sensitivity;
film sensitivity display means for displaying the film sensitivity in accordance with said signal of film sensitivity;
means for changing the displaying modes of said sensitivity display means in accordance with said outputs from said discriminating means; and
means for winding-up the film on said film take-up spool.

15. A camera as defined in claim 14, wherein said displaying modes changing means includes circuit means which causes said film sensitivity displaying means to continuously display when said signal of film sensitivity is consistent with said given signal and to intermittently display when said signal of film sensitivity is inconsistent with said given signal.

16. A camera as defined in claim 14 or 15 wherein said coded perforations of the film include those representing the film sensitivity of the film so that said coded perforations detecting means can read out the film sensitivity of the film, and wherein said means for generating said signal of film sensitivity is connected to said coded perforations detecting means so that said signal represents the film sensitivity of the film.

* * * * *